United States Patent [19]
Kato et al.

[11] Patent Number: 5,897,251
[45] Date of Patent: Apr. 27, 1999

[54] IMAGE FORMING APPARATUS ALLOWING APPROPRIATE FORMATION OF AN IMAGE ON TWO-PAGE SPREAD

[75] Inventors: Tomokazu Kato, Toyokawa; Hiroyasu Ito, Okazaki; Eiichi Yoshida, Toyokawa, all of Japan

[73] Assignee: Minolta Co., Ltd., Osaka, Japan

[21] Appl. No.: 08/881,587

[22] Filed: Jun. 24, 1997

[30] Foreign Application Priority Data

Jun. 25, 1996 [JP] Japan ................................ 8-164372

[51] Int. Cl.⁶ .................................................. G03G 15/00
[52] U.S. Cl. .......................... 399/408; 399/82; 399/193
[58] Field of Search .............................. 399/43, 82, 83, 399/193, 194, 408; 358/448

[56] References Cited

U.S. PATENT DOCUMENTS

| | | | |
|---|---|---|---|
| 4,592,651 | 6/1986 | Oikawa et al. | 399/408 X |
| 4,640,611 | 2/1987 | Ohdake et al. | |
| 4,708,469 | 11/1987 | Bober et al. | |
| 4,745,441 | 5/1988 | Maruta et al. | 399/193 |
| 4,814,822 | 3/1989 | Acquaviva et al. | |
| 4,941,017 | 7/1990 | Mishima et al. | 399/193 |
| 5,016,051 | 5/1991 | Morikawa et al. | 399/193 |
| 5,119,135 | 6/1992 | Baldwin | 399/193 |
| 5,717,843 | 2/1998 | Tabata et al. | 358/448 X |

FOREIGN PATENT DOCUMENTS 4-149461  5/1992  Japan.

*Primary Examiner*—Sandra Brase
*Attorney, Agent, or Firm*—McDermott, Will & Emery

[57] ABSTRACT

An apparatus allowing double-leaved side wiring or saddle wiring of copied sheets of paper performs the following process for forming an image on a two-page spread. In accordance with the direction of the document set on the apparatus, whether or not the image formed on the document should be divided and turned to an image of a two-page spread is determined. When a two-page spread image is to be formed, a blank page is inserted to the images to be printed on the sheets, or the order of images to be printed is exchanged. Thus an image is properly formed on a two-page spread.

29 Claims, 29 Drawing Sheets

FIG.5A

| AREA | PAGE | FORWARD CONCATENATION | REARWARD CONCATENATION | DIVISION | ADDITIONAL INFORMATION |
|---|---|---|---|---|---|
| 00 | 1 | 00 | 01 | 0 | |
| 01 | 1 | 01 | FF | 0 | |
| 02 | 2 | 00 | 03 | 0 | |
| 03 | 2 | 03 | FF | 0 | |
| ⋮ | ⋮ | ⋮ | ⋮ | ⋮ | |

| | |
|---|---|
| 0 | COMPRESSED DATA1 OF PAGE1 |
| 32K | COMPRESSED DATA2 OF PAGE1 |
| 64K | COMPRESSED DATA1 OF PAGE2 |
| 96K | COMPRESSED DATA2 OF PAGE2 |
| ⋮ | ⋮ |

BOOKBINDING MODE A (DOUBLE-LEAVED SIDE WIRING)

(a) N=EVEN NUMBER (b) N=ODD NUMBER

FIG. 26A (a) PAGE EXCHANGE

| AREA | PAGE | FORWARD CONCATENATION | REARWARD CONCATENATION | DIVISION |
|---|---|---|---|---|
| 00 | 1 | 00 | 01 | 0 |
| 01 | 1 | 01 | FF | 0 |
| 02 | 2 | 00 | 03 | 0 |
| 03 | 2 | 03 | FF | 0 |
| 04 | 3 | 00 | 05 | 1 |
| 05 | 3 | 05 | FF | 1 |
| 06 | 4 | 00 | 07 | 1 |
| 07 | 4 | 07 | FF | 1 |
| 08 | 5 | 00 | 09 | 0 |
| 09 | 5 | 09 | FF | 0 |
| 10 | 6 | 00 | 11 | 0 |
| 11 | 6 | 11 | FF | 0 |
| 12 | 7 | 00 | 13 | 0 |
| ... | ... | ... | ... | ... |

FIG. 26B

| PAGE | FORWARD CONCATENATION | REARWARD CONCATENATION |
|---|---|---|
| 1 | 00 | 01 |
| 1 | 01 | FF |
| 2 | 00 | 03 |
| 2 | 03 | FF |
| 4 | 00 | 05 |
| 4 | 05 | FF |
| 5 | 00 | 07 |
| 5 | 07 | FF |
| 3 | 00 | 09 |
| 3 | 09 | FF |
| 6 | 00 | 11 |
| 6 | 11 | FF |
| 7 | 00 | 13 |
| ... | ... | ... |

FIG. 27A (b) BLANK SHEET INSERTION

| AREA | PAGE | FORWARD CONCATENATION | REARWARD CONCATENATION | DIVISION |
|---|---|---|---|---|
| 00 | 1 | 00 | 01 | 0 |
| 01 | 1 | 01 | FF | 0 |
| 02 | 2 | 00 | 03 | 0 |
| 03 | 2 | 03 | FF | 0 |
| 04 | 3 | 00 | 05 | 1 |
| 05 | 3 | 05 | FF | 1 |
| 06 | 4 | 00 | 07 | 1 |
| 07 | 4 | 07 | FF | 0 |
| 08 | 5 | 00 | 09 | 0 |
| 09 | 5 | 09 | FF | 0 |
| 10 | 6 | 00 | 11 | 0 |
| 11 | 6 | 11 | FF | 0 |
| 12 | 7 | 00 | ... | ... |
| ... | ... | ... | ... | ... |

FIG. 27B

| PAGE | FORWARD CONCATENATION | REARWARD CONCATENATION |
|---|---|---|
| 1 | 00 | 01 |
| 1 | 01 | FF |
| 2 | 00 | 03 |
| 2 | 03 | FF |
| 4 | 00 | 05 |
| 4 | 05 | FF |
| 5 | 00 | 07 |
| 5 | 07 | FF |
| 6 | 00 | 09 |
| 6 | 09 | FF |
| 7 | 00 | 11 |
| 7 | 11 | FF |
| 8 | 00 | 13 |
| ... | ... | ... |
| 3 | 00 | FF |

DESIGNATION OF POSITION FOR BLANK SHEET INSERTION
(WHEN PAGES 3&4 CONTAIN DIVIDED IMAGE)

NORMAL SADDLE WIRING MODE

INSERT BLANK SHEET TO 1ST PAGE

INSERT BLANK SHEET TO 2ND PAGE

APPLICATION TO DOUBLE SIDED COPY MODE
(WHEN PAGES 3&4 CONTAIN DIVIDED IMAGE)

(1) PAGE EXCHANGE (2) BLANK SHEET INSERTION

5,897,251

IMAGE FORMING APPARATUS ALLOWING APPROPRIATE FORMATION OF AN IMAGE ON TWO-PAGE SPREAD

BACKGROUND OF THE INVENTION

1. Field of the Invention

The present invention relates to an image forming apparatus, and more specifically, to an image forming apparatus by which an image can be formed on two-page spread, i.e., over both sides of a binding portion.

2. Description of the Related Art

An image forming apparatus having a bookbinding function has been known, for the purpose of binding output images. Specially, in a digital copying machine or a printer which stores images and forms images on sheets of paper allows image formation for bookbinding employing saddle wiring or double-leaved side wiring.

Saddle wiring refers to a method of bookbinding in which sheets of paper are stacked, the sheets are folded at the center, and the sheets are stitched at the center for bookbinding. Image formation for bookbinding employing saddle wiring by a digital copying machine or a printer is performed in the following manner. For example, assume that original documents having the size of A4 fed in transverse direction are to be copied and bound. In the bookbinding, one page has the size of A4. Two images each having the size of A4 are formed on each surface of a sheet having the size of A3 and fed in longitudinal direction. Namely, a total of four images are formed on the sheet, and the sheets are stacked, folded at the center and stitched at the center. Here, transverse feeding direction refers to the feeding direction in which longer side of the document or the sheet is at a right angle to the direction of conveying. The longitudinal feeding direction refers to a direction in which the shorter side of the document or the sheet is at a right angle to the conveying direction. Method of image formation for saddle wiring is disclosed, for example, in U.S. Pat. No. 4,640,611.

The double-leaved side wiring refers to a method of binding in which a sheet is folded into two at the center, the folded sheets are stacked, and open ends of the stacked sheets are stitched. Image formation for bookbinding employing double-leaved side wiring by a digital copying machine or a printer is performed in the following manner. For example, assume that documents having the size of A4 and fed in the transverse direction are to be copied and bound. One page of the book has the size of A4. Two images each having the size of A4 are formed on one surface of a sheet having the size of A3, which sheet is folded into two at the center. Such folded sheets are stacked and stitched at the open end portion of the sheets.

Therefore, in either of the saddle wiring and double-leaved side wiring, one image is formed on the left side and one image is formed on the right side of one surface of the sheet. Therefore, a sheet having such size that allows formation of two-page spread image is desired. For example, when a document having A4 size and fed in the transverse direction is to be copied, it is desirable to use a sheet having the size of A3 and to feed this sheet in the longitudinal direction.

A sheet of an appropriate size is not generally available when a document fed in longitudinal direction is to be copied. When two pages of a document fed in the longitudinal direction are to be copied on a sheet having the size of A3 and fed in the longitudinal direction, using the space of A4 size in the transverse direction as one page, the image should be reduced so that it can be copied within one page or the image should be rotated. However, when the image is reduced to be within one page, the image becomes too small, which is not preferable for the reader. When the image is rotated so that the image in the longitudinal direction is set in the transverse direction, it is not preferable either for the reader, as the original direction is changed.

A method of image formation without reduction of image size or change in direction has been proposed, for example, in Japanese Patent Laying-Open No. 4-149461. In this proposed method, a document having a spread, that is, an image extending over both sides of a binding portion, or an image of a document fed in the longitudinal direction is divided or enlarged and divided, and copied separately onto two pages. In bookbinding copies including such an image divided, or enlarged and divided in the above described manner, it is possible that the image which should be placed on both sides of the binding portion, that is, continuously over two pages is not on both sides of the binding portion but separated in the front and back pages, dependent on the position of the pages on which the image is formed.

U.S. Pat. No. 4,640,611 discloses a method of bookbinding which prevents the divided image from being placed separately on a front and back pages and ensures the divided image to appear on both sides of the binding portion, in two-page spread. According to this method, a portion corresponding to the first page of the sheet is made blank and copying operation is started from an even-numbered page. However, according to this method, it is not possible to form an image on the first page. Further, this method cannot be applied when documents fed in the longitudinal direction and documents fed in the transverse direction are mixed.

SUMMARY OF THE INVENTION

One object of the present invention is to provide an image forming apparatus capable of forming images without reduction of image size or change in image direction and allows the image to be presented as a continuos information, even when documents fed in the longitudinal direction and transverse direction are mixed, when images are formed for bookbinding employing saddle wiring or double-leaved side wiring.

The object is attained by an image forming apparatus in accordance with one aspect of the present invention which includes an image forming unit for forming a plurality of images on a sheet of paper, an image forming position setting unit for setting positions of the images to be formed on the sheet, a designating unit for designating a prescribed image out of the plurality of images to be formed, and an image forming position changing unit for changing the position of image formation so that the position of image formation of the designated image is at the prescribed position.

According to another aspect of the present invention, a method of image formation includes the steps of setting an image forming position for setting positions of images on a sheet, designating a prescribed image out of a plurality of images, and forming a plurality of images on the sheet by changing the position of image formation such that the position of image formation of the designated image matches the position set in the step of setting the image forming position.

According to a still further aspect of the present invention, the image forming apparatus includes an image taking unit for taking image data including a plurality of pages, a determining unit for determining pages corresponding to a spread out of the taken image data, and an output unit for outputting the image data of the pages which are determined to be on a spread is printed as an image over a two-page spread.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B show relation of a management table and a code memory.

FIGS. 26A and 26B show examples of management table in a page exchanging mode.

FIGS. 27A and 27B show examples of management table in a blank sheet inserting mode.

DESCRIPTION OF THE PREFERRED EMBODIMENTS

Figure 1:
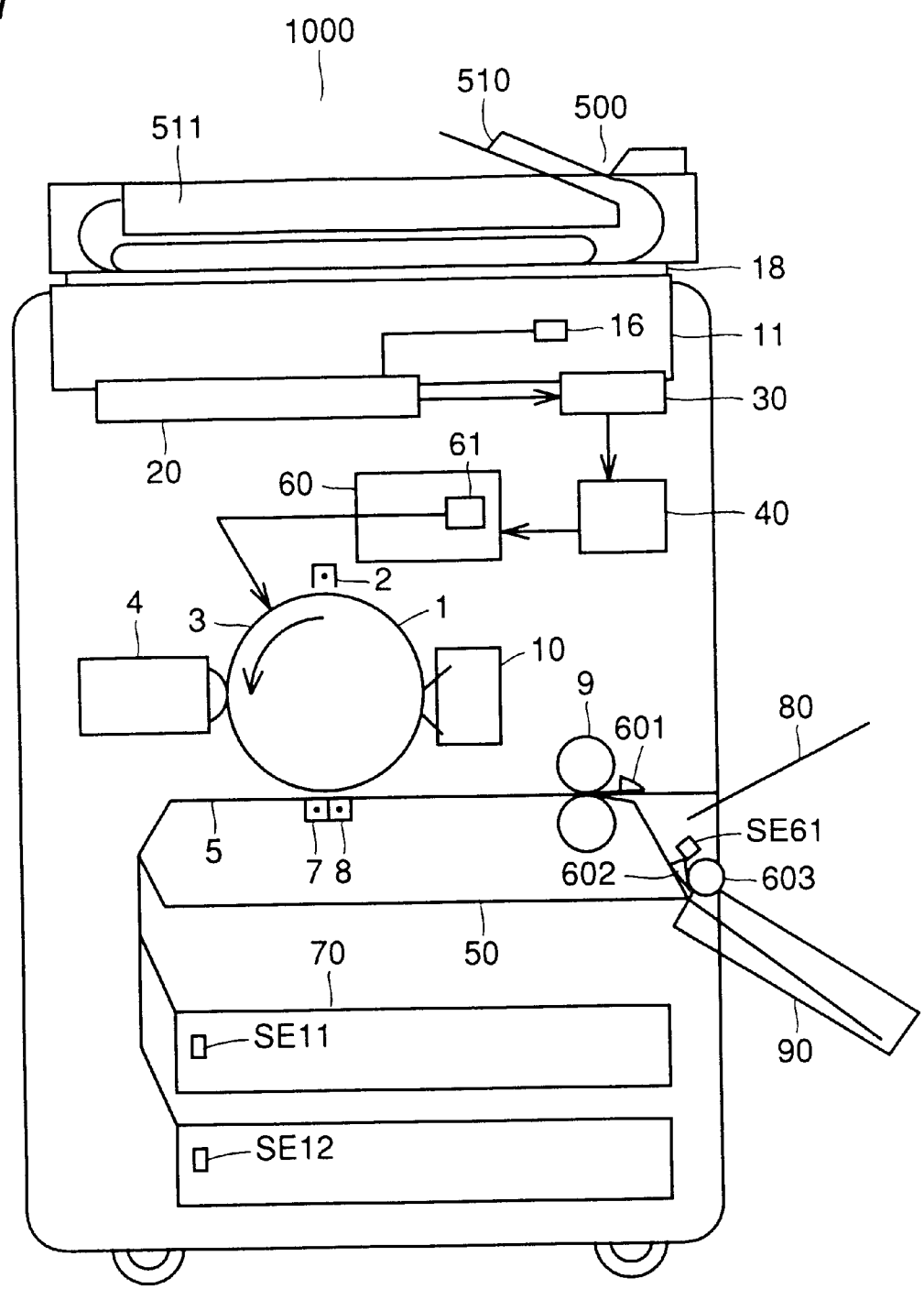
FIG. 1 is front view showing a schematic internal structure of a copying machine.

FIG. 1 is a cross section showing an overall structure of a copying machine related to the present invention.

The copying machine 1000 mainly includes a scanner 11, a laser optical system 60 an image forming system.

Scanner 11 reads an original placed on a platen 18, converts the document information to image signals by a CCD (Charge Coupled Device) 16 and outputs the signals. Scanner 11 simultaneously reads the size and shape of the document placed on the platen as well as the direction of paper feeding. Image signals output from scanner 11 are processed by an image signal processing portion 20 and memory unit portion 30 controls whether to output the image data directly to an operator, store the image data in a memory, or the like. Printing portion 40 drives a semiconductor laser 61 in laser optical system 60 based on the image data output from memory unit portion 30. The laser beam from semiconductor laser 61 is directed to an exposure position 3 on a photoreceptor drum 1 by laser optical system 60.

The image forming system mainly includes a corona charger 2, a developer 4, a transfer charger 7, a separation charger 8 and a cleaner 10 provided around a photoreceptor 1, as well as a paper feed cassette 70, a fixing roller 9, a paper re-feeding tray 90 and a discharge tray 80 provided along a conveying path 5. Photoreceptor drum 1 is charged uniformly by corona charger 2, and exposed by a laser beam from semiconductor laser 61 at an exposure position 3. A latent image formed by exposure is developed by developer 4, and a toner image is formed.

The toner image formed in this manner is transferred by transfer charger 7 onto a sheet of recording paper fed from paper feed cassette 70. Paper feed cassette contains a stack of recording paper, and it feeds the sheet of recording paper when image is formed. Further, paper feed cassette 70 is provided with size detecting sensors SE11 and SE12, so that the size of the paper contained therein can be detected.

The recording paper on which toner image has been transferred is separated from photoreceptor 1 by separation charger 8 and fixed by fixing roller 9. The recording paper on which toner image is fixed by fixing roller 9 is discharged to discharge tray 80. A switching pawl 601 switches between discharge of the recording paper which has passed through fixing roller 9 to discharge tray 80 and re-feed tray 90.

In a double sided copy mode, in a first copying operation, the switching pawl 601 is switched to the side of the re-feeding conveying path, and a sheet of recording paper on one surface of which an image has been formed is put in the re-feeding tray 90. The re-feeding tray 90 temporarily holds the sheet of paper which has passed through fixing roller 9. When rear edge of the last sheet of recording paper contained in re-feeding tray 90 is detected by discharge sensor SE61, reversing roller 603 rotates in reverse direction, and the sheet of recording paper contained in re-feeding tray 90 is fed again. The re-fed recording paper is conveyed through re-feeding path 50 to feeding path 5, and image is formed on the rear surface and discharge to discharge tray 80.

By switching the switching pawl 602, it is possible to feed the sheet of recording paper directly to the re-feeding path 50 without passing it to the discharge tray 80. In a composite copying mode, the sheet of recording paper is not put in the discharge tray 80 but directly re-fed, so that the front and rear sides of the sheet are not reversed, and composite images can be formed on one same surface of the sheet of recording paper.

Original conveying apparatus 500 automatically conveys an document set on an document feed tray 510 onto platen 18, and discharges a document read by scanner 11 to document discharging portion 511.

In the normal mode, one or a plurality of documents are set in document feeding tray 510 with the side to be read facing upward. After the start of operation, the set document is fed one by one starting from the lowermost document. The fed document is set at an exact position on platen 18. When document is set at the exact reading position on platen 18, reading of the document by scanning is performed by scanner 11. After the document is read, the document is discharged to discharge tray 511 with the read surface facing upward.

Figure 2:
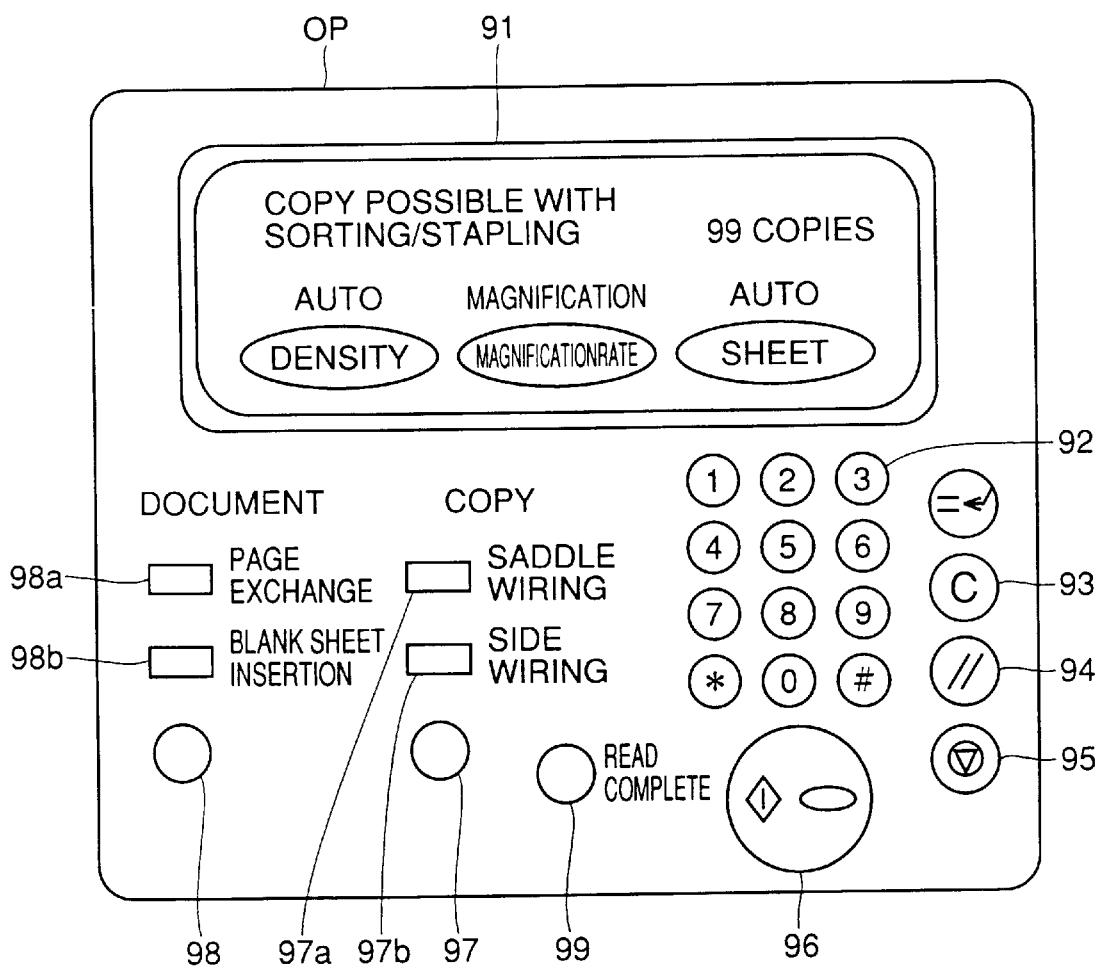
FIG. 2 is a plan view showing a structure of an operation panel.

FIG. 2 is a plan view showing a structure of an operation panel OP. Operation panel OP is provided with a liquid crystal touch panel 91, ten keys 92 for inputting magnification rate or number of copies and so on, a clear key 93 for returning the set number to a standard value "1", for example, a panel reset key 94 for returning values set in the copying machine to standard values, a stop key 95 for stopping copying operation, and a start key 96 for starting copying operation.

Further, operation panel OP is provided with a bookbinding mode setting key 97 for selecting and setting any one of saddle wiring mode, double-leaved side wiring mode and normal mode; a key 98 for selecting whether pages should be exchanged or a blank sheet should be inserted when a two-page spread is to be formed; a read completion key 99 for inputting the information of read completion when all documents have been read; an indicating portion 97a indicating that the selected and set bookbinding mode is saddle wiring mode; an indicating portion 97b indicating that the selected mode is the double-leaved side wiring mode; an indicating portion 98a indicating page exchanging mode selected in the bookbinding mode; an indicating portion 98b indicating blank sheet inserting mode selected in the bookbinding mode, and so on. In the bookbinding mode, it is possible to manually input information for dividing by ten key 92 for every document page.

Liquid crystal touch panel 91 displays information including state of operation of the copying machine such as exposure level, magnification rate, size of the recording paper, various states of failure of the copying machine such as jamming, occurrence of a service man call or paper empty, and it allows input of automatic selection mode designation such as density, magnification rate, recording paper, and information for division. When automatic selection mode for dividing information is designated, information for dividing is automatically input to the memory region of a corresponding page of a document fed in the longitudinal direction.

Figure 3:
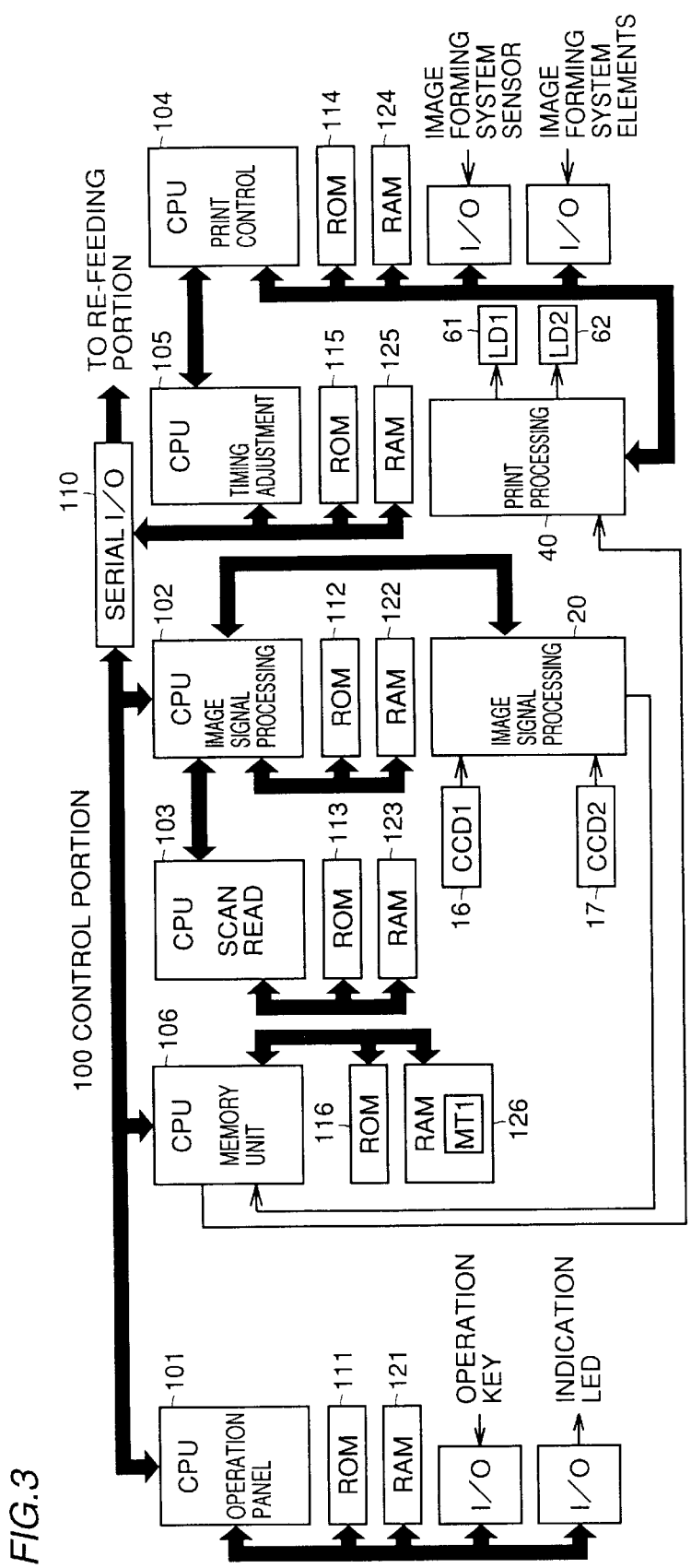
FIG. 3 is a block diagram showing a circuit structure of a control portion of a copying machine.

FIG. 3 is a block diagram showing a structure of a control portion 100 of the copying machine. Control portion 100 is mainly consisting of six CPUs 101 to 106. CPUs 101 to 106 are connected to ROMs 111 to 116 storing programs and to RAMs 121 to 126 as working areas, respectively.

CPUs 101, 102, 105 and 106 are connected to each other via serial input/output interface (serial I/O) 110, so as to enable exchange of necessary information.

CPU 101 controls input through various operation keys on operation panel OP and output to indicating portions. CPU 102 controls various portions in image signal processing portion 20. CPU 103 controls driving of scanner 11. CPU 104 controls printing portion 40, laser optical system 60 and image forming system, and CPU 105 performs processing for overall timing adjustment and setting of operation mode of control portion 100 as a whole.

CPU 106 controls memory unit portion 30, such that the read image data is temporarily stored in image memory 304 and thereafter the data is read and output to printing portion 40.

Various processing portions processing the image data will be described briefly in the following.

Image signal processing portion 20 includes an A/D converter, a shading collection portion, a color determining portion for determining color of pixels of the document based on image data, a magnification processing portion, an image quality correcting portion and so on. Image signals input from photo electric converting element 16 are subjected to A/D conversion, quantized to pixel data of 8 bits pixel by pixel, subjected to various processings such as shading correction, determination of pixel color, magnification and image quality correction, and output as image data D2. Together with this, color data DC of 1 bit indicating whether the color is a designated specific color is output corresponding to each pixel of image data D2.

Memory unit 30 will be described.

Figure 4:
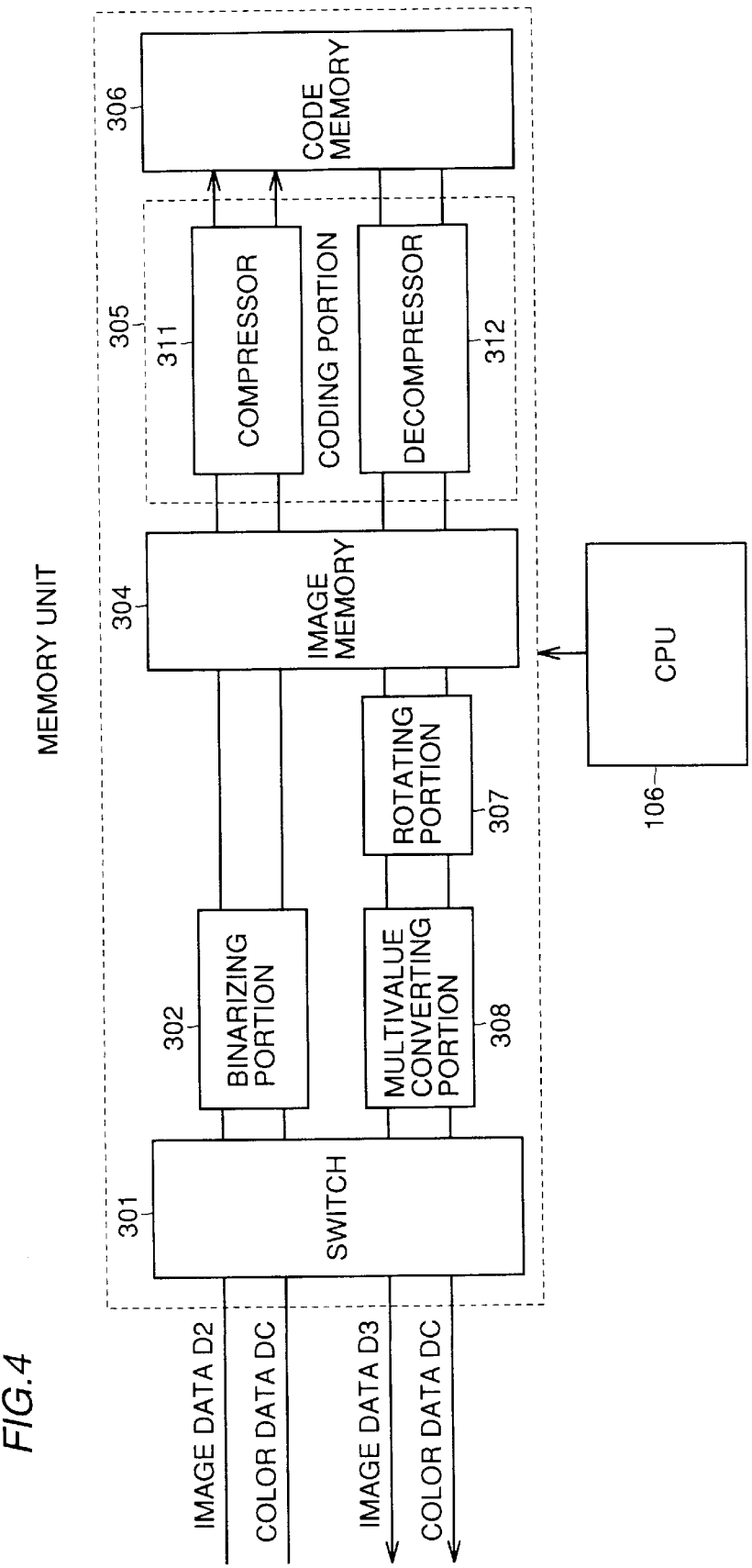
FIG. 4 is a schematic block diagram of a memory unit portion in the control portion of the copying machine.

FIG. 4 is a schematic block diagram of memory unit 30. Memory unit 30 includes a switching portion 301; a binarizing portion 302 providing binary data based on parameter setting from CPU 106; a multiport image memory 304 having a capacity of two pages of images having the size of A4 with the resolution of 400 dpi; a coding portion 305 having a compressor 311 and a decompressor 312 which can operate independent from each other; a multiport code memory 306; a rotating portion 307; a multivalue converting portion 308 for providing multivalued data based on parameter setting from CPU 106; and a CPU 106 for overall control of these components.

Coding portion 305 reads data when image data D2 is written to image memory 304, compresses the data to provide coded data, and writes the data in code memory 306. In response to an instruction from CPU 106, it reads code data written in code memory 306, expands it to provide image data, and writes the data in image memory 304.

When image data corresponding to one page is generated in image memory 304 by decompression, the data is read, rotated as needed in rotation portion 307, image data of multivalues is generated in multivalue converting portion 308, and the resulting image data is output as image data D3. Compressor 311 and decompressor 312 are operable independent from each other and parallel to each other, and between these and code memory 306, DMA transfer of data is possible.

Code memory 306 is managed by management table MT1 stored in RAM 126.

FIGS. 5A and 5B show relation between management table M1 and code memory 306. Code memory 306 is divided into memory areas of 32K byte unit. In order to enable simultaneous control of writing (at the time of reading of image data) and reading (at the time of printing), code data is stored in each area. Management table MT1 of each page stores the number indicating the code memory area, a page number, the number of concatenated area, data indicating divisional scan data, various information necessary for compression/decompression such as the manner of compression, data length and the like. Based on the information, code memory 306 is dynamically managed.

FIG. 5A indicates the content of management table MT1. Forward concatenation indicates forward concatenation of each area containing 32K byte unit within one page and indicates whether or not the area is the first area. If it is 00, it means that the area is the first area. Otherwise, the value represents the preceding area number. Similarly, the rearward concatenation indicates concatenation of rearward direction of each area, and whether the area is the last area. If it is FF, it means that the area is the last area, and the value represents the succeeding area number.

FIG. 5B shows content of code memory 306. It represents that at memory addresses 0 to 32K, compressed data 1 of page 1 is stored, and in memory addresses 32K to 64K, compressed data 2 of page 1 is stored.

When image data is read from image memory 304 and is compressed, CPU 106 controls compressor 311 while generating information to be stored in management table MT1, and stores in code memory 306. When image data is output, code data is read from code memory 306 in the reverse manner. Information in management table MT1 is erased when information corresponding to one page is read out for the number of times corresponding to the desired number of copies.

As for the operation of memory unit 30, image data D2 is binarized and taken in the image memory 304 for prescribed processing, and the data is read as needed from image memory 304 and output as image data D3 to printing portion 40.

Operation sequence of the copying machine as a whole will be described mainly focused on commands such as request and answers exchanged between CPUs 101 to 106, and the data flow. In the following, commands including request and answers not of interest may be omitted.

Figure 6:
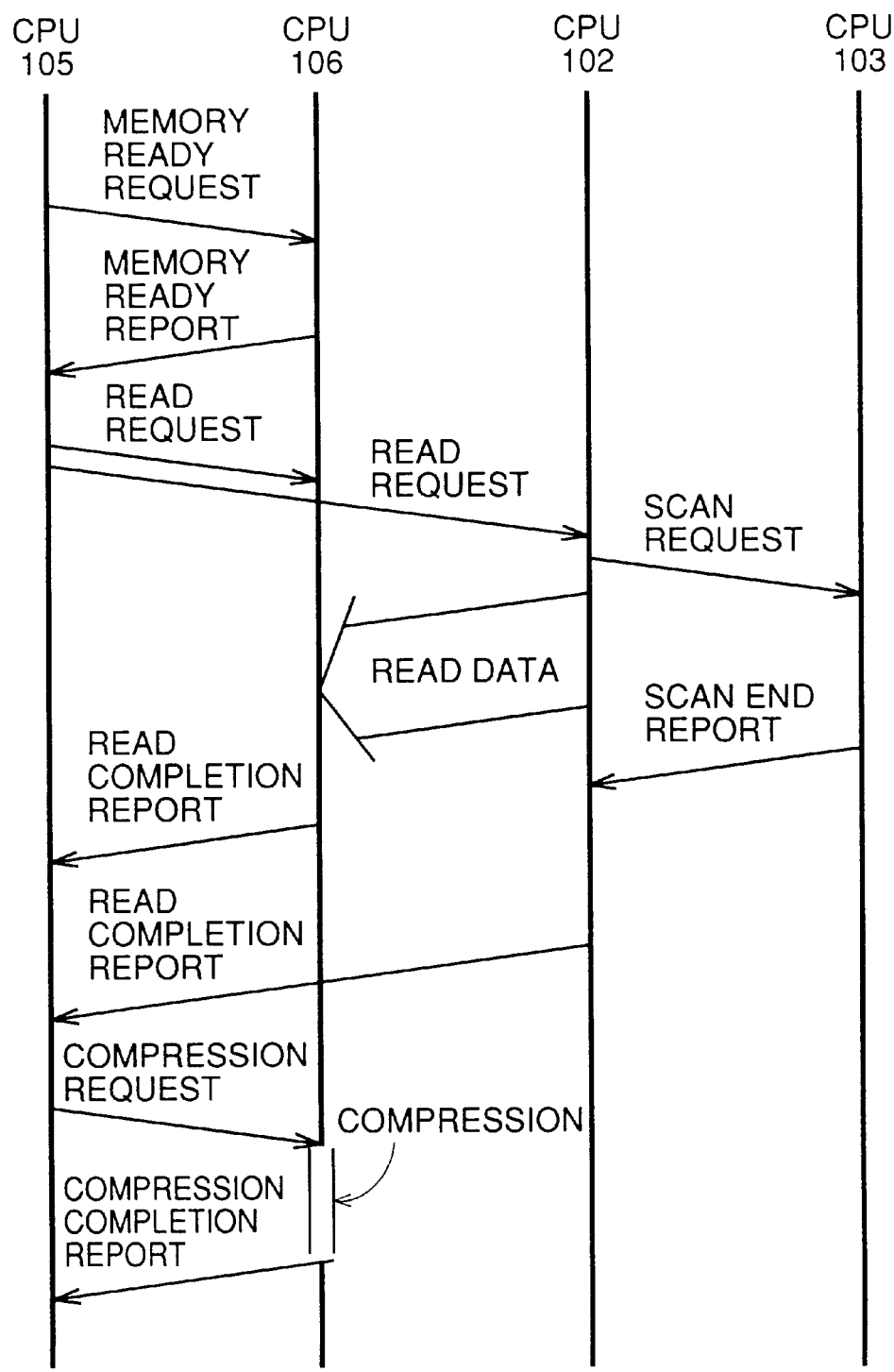
FIG. 6 shows operation sequence of a memory writing operation.

FIG. 6 shows operation sequence of memory writing. Here, image data is transferred from reading apparatus IR to image memory 304.

First, CPU 105 managing the overall sequence issues a document exchange request to CPU 106. Upon reception of this request, CPU 106 sets internal hardware, for example, sets connection of switching portion 301 for transferring image data D2 from image signal processing portion 20 to image memory 304, sets mode for binarization (for example, error variants, threshold value for base erasure, threshold value for binarization), sets start address of the area of writing of image memory 304, and sets XY length information.

When such settings are completed, CPU 106 outputs a memory ready report to CPU 105. In response, CPU 105 outputs a read request to CPUs 106 and 102, and CPU 102 outputs a scan request to CPU 103, whereby scanning starts. When image area of the document is reached by the scanning, in accordance with the image processing mode sets by CPU 102, read data (image data B2) is output.

When reading by scanning completes, CPUs 106 and 102 respectively issue read complete report to CPU 105. Thereafter, CPU 105 outputs a compression request to CPU 106. In response, CPU 106 sets read address from image memory 304, XY length information, write address to code memory 306 and mode of a compressor 311 (for example MH method) and activates the compressor. Consequently, compression processing is performed, and code data is stored in code memory 306. When compression is completed, compression complete report is output from CPU 106 to CPU 105.

Figure 7:
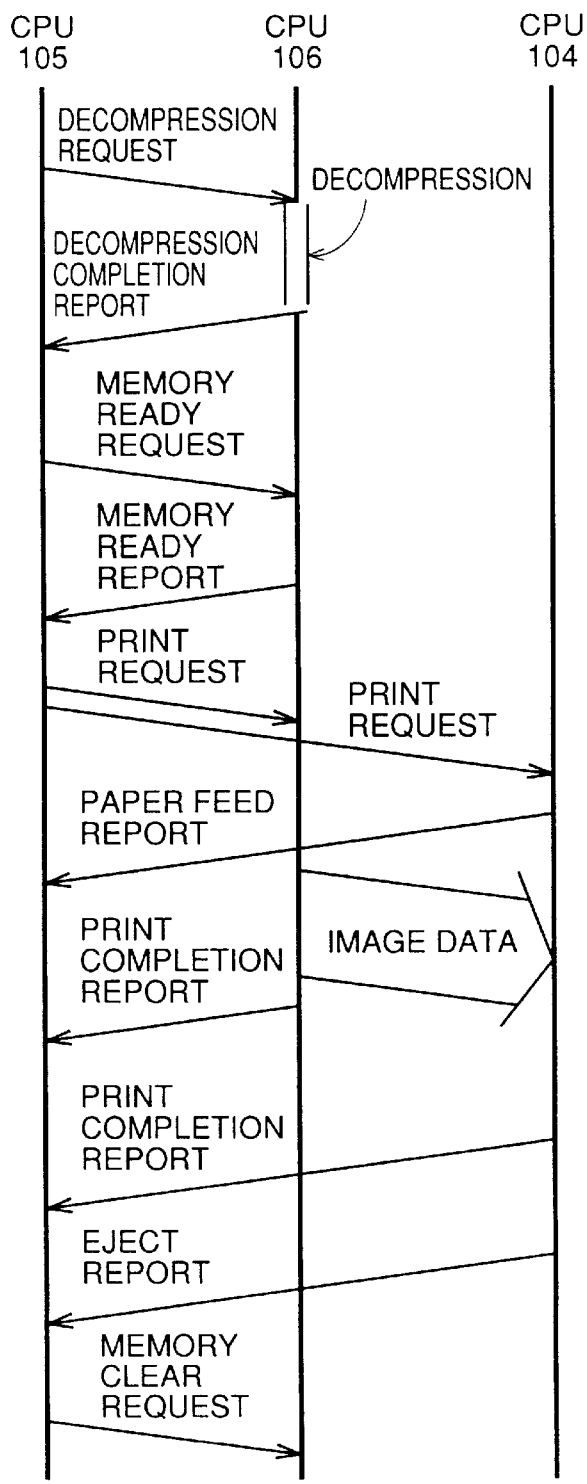
FIG. 7 shows an operation sequence of a memory reading operation.

FIG. 7 shows operation sequence of memory reading. Here, image data is read from image memory 304 and output to printer apparatus PRT and is printed.

First, a decompression request is output from CPU 105 to CPU 106. In response, CPU 106 sets read address from code memory 306, data amount, write address to image memory 304, XY length information and mode of decompressor 312 (for example MH method), and activates the decompressor. Consequently, decompression is performed, and image data is written to image memory 304. When decompression is completed, decompression complete report is output from CPU 106 to CPU 105. Thereafter, from CPU 105 to CPU 106, a memory ready request is output for reading image data from image memory 304. In response, CPU 106 performs setting of connection of switching portion 301 for outputting image data D3 from image memory 304 to print portion 40, settings of rotation, start address of read area of image memory 304, XY length information and so on.

When such settings are completed and the memory is ready, CPU 106 outputs a memory ready report to CPU 105. In response, a print request is output from CPU 105 to CPUs 106 and 104. When a paper feed report indicating the state of conveying the sheet is output from CPU 104 to CPU 105, image data D3 read from image memory 304 is output to printer apparatus PRT, and printing is performed.

When printing is completed, a print complete report and an eject complete report are output from CPUs 106 and 104 to CPU 105. In response, CPU 105 outputs a memory clear request, for example, to CPU 106, in accordance with the operation mode.

Specific examples of the bookbinding mode will be described with reference to FIGS. 8, 9, and 10. Here, documents having the size of A4 and fed in transverse direction read by scanner 11 are printed on sheets of recording paper having the size of A3 and fed in the longitudinal direction, as an example. However, other combinations of the documents and recording paper having different sizes may be possible. Here, the transverse paper feed direction refers to a direction in which longer side of the document or the sheet of paper is at a right angle with respect to the conveying direction, and longitudinal feeding direction refers to a direction in which the shorter side of the document or the paper is at a right angle with respect to the direction of conveying.

Figure 8:
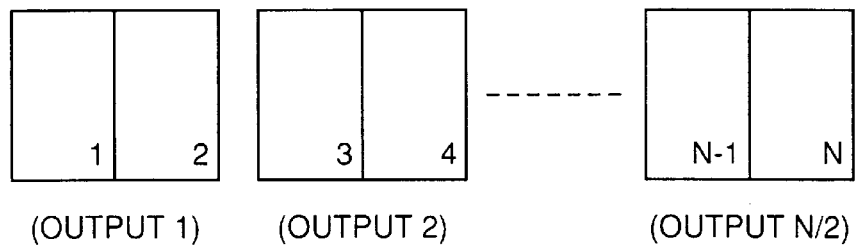
FIG. 8 is an illustration of a bookbinding mode A (double-leaved side wiring).
Figure 8:
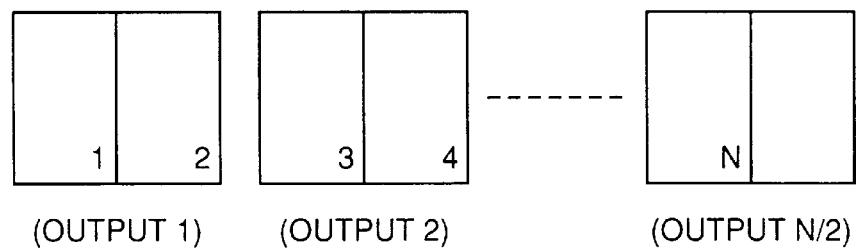

FIG. 8 is an illustration of bookbinding mode A (double-leaved side wiring). Documents having the size of A4 (transverse feeding) read by scanner 11 are printed in the order represented by the numbers in the figure, on one side of sheets of recording paper having the size of A3 (longitudinal feeding). The Nth document which is the last document is printed on the right side of the sheet which is printed last as shown in FIG. 8(a) when the total number of pages N of the documents is an even-number. When the total number of pages N is an odd-number, it is printed on the left side of the sheet of recording paper printed last as shown in FIG. 8(b) and the right side of the sheet is blank. By such processing, in the bookbinding mode A (double-leaved side wiring), each sheet on the printed recording paper is folded at the center, the folded sheets are stacked and the open end portions are stitched, thus double-leaved bookbinding is finished.

Figure 9:
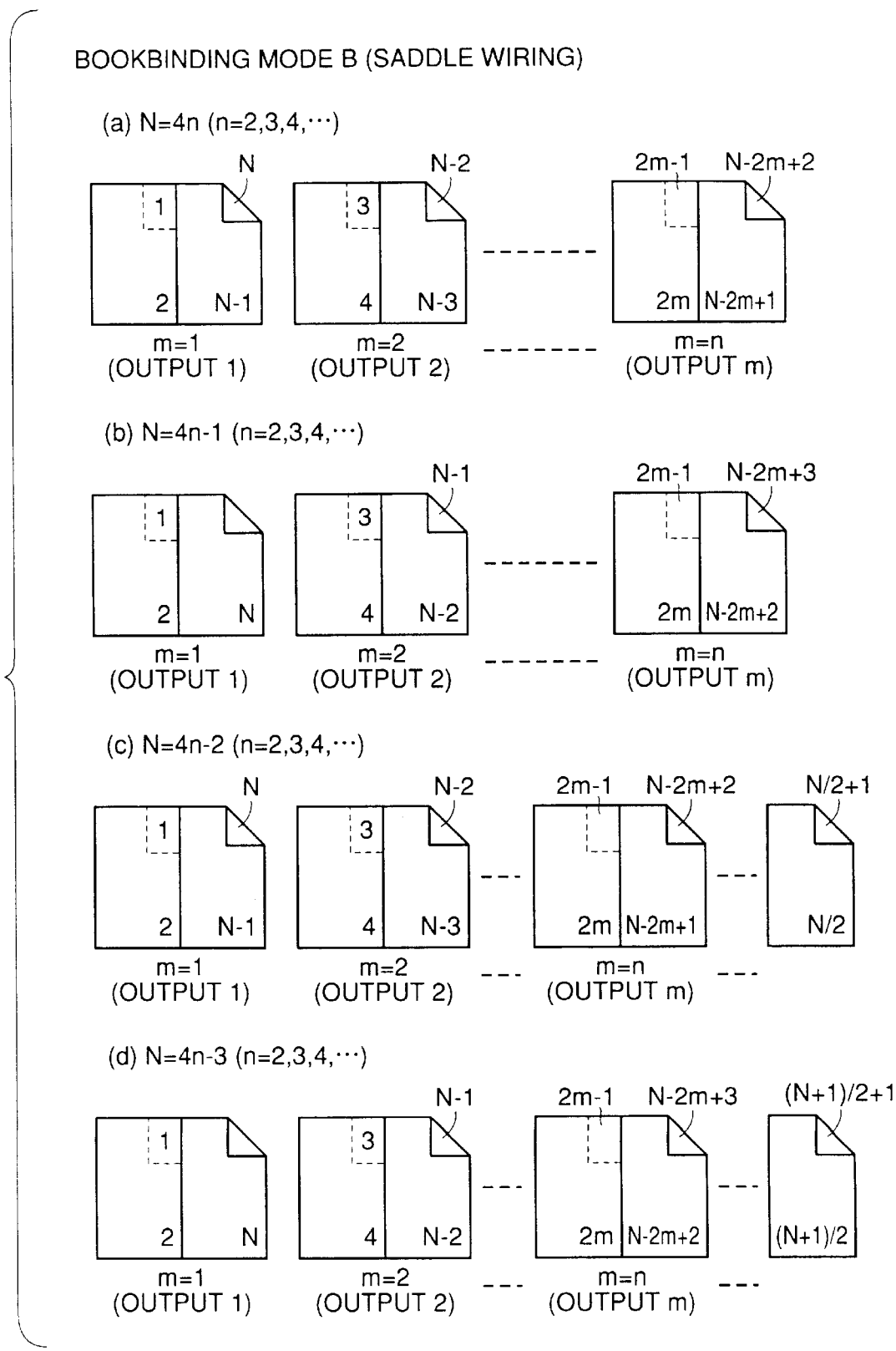
FIG. 9 is an illustration of a bookbinding mode B (saddle wiring).

FIG. 9 is an illustration of bookbinding mode B (saddle wiring). Documents having the size of A4 (transverse feeding direction) read by scanner 11 are printed in the order of the numbers shown in the figure, on both surfaces of the sheets of recording paper having the size of A3 (longitudinal feeding). Referring to FIG. 9, m is a variable showing what is the order of the recording paper output. For example, m=1 represents a sheet of recording paper which is printed and discharged first. The number on a lower right corner of a rectangle representing the sheet of recording paper represents the paper number on the surface of the recording paper. For example, "2" represents that the page number of the surface of the recording paper is 2, and "N−1" represents that the page number of the surface of the recording paper is N−1. The number surrounded by a dotted line at an upper right corner of the rectangle representing the recording paper is the page number of the rear surface of the recording paper.

"1" represents that the page number of the rear surface of the recording paper is 1, and "N" represents that the page number of the rear surface of the recording paper is N. Other numbers on the recording paper similarly represent the page number on the front surface or rear surface of the recording paper.

If the total number of pages N of the documents is exactly divisible by 4, the first document is printed on the rear surface on the left side of first sheet of the recording paper and the Nth document, which is the last document, is printed on the rear surface on the right side of the first sheet of recording paper, as shown in FIG. 9(a).

When the total number of pages N of the document is divisible by 4 with reminder 3, the first document is printed on the rear surface on the left side of the first sheet of recording paper and the Nth document, which is the last document, is printed on the front surface on the right side of the first sheet of recording paper and the rear surface on the right side is blank, as shown in FIG. 9(b).

When the total number of pages N of the document is divisible by 4 with reminder 2, the first document is printed on the rear surface on the left side of the first sheet of recording paper as shown in FIG. 9(c). The Nth document, which is the last document, is printed on the rear surface on the right side of the first sheet of recording paper, and N/2th document and N/2+1th document are printed on the front and rear surfaces of a sheet of recording paper having the size of A4 (transverse feeding direction). As the documents are copied on a sheet of half size at the central page, it becomes possible to print the documents eliminating the last blank page.

When the total number of pages N of the documents is divisible by 4 with reminder 1, the first document is printed on the rear surface on the left side of the first sheet of recording paper as shown in FIG. 9(d). The Nth document, which is the last document, is printed on the front surface on the right side of the first sheet of recording paper, and the rear surface on the right side is blank. The (N+1)/2th document and (N+1)/2+1th document are printed on the front and rear surfaces of a sheet of recording paper having the A4 size (transverse feeding direction).

By the above described processing, in the bookbinding mode B (saddle wiring), the stack of printed sheets of recording paper is folded at the center in the stacked state, and the sheets are stitched at the crease (folded line), and thus saddle wiring is finished.

A method of printing providing a two-page spread image when bound in bookbinding modes A and B will be described. FIG. 10 shows an example of printing when pages 3 and 4 of the document is printed as a two-page spread in the bookbinding mode B.

FIG. 10(a) shows a method of providing a two-page spread by exchanging pages. The pages 3, 4 and 5 of the read documents are printed in different order, so that pages 3 and 4 provides a two-pages spread image when bound.

FIG. 10(b) shows a method of providing a two-page spread by inserting a blank sheet. A blank sheet is inserted before pages 3 and 4 of the document. By this processing, pages 3 and 4 of the documents are spread when bound.

Memory writing control and memory reading control in the above described bookbinding modes will be described with reference to the flow charts of FIGS. 11 to 25.

Here, the main routine executed by CPUs 101 to 106 will be described first and thereafter subroutines in the main routine will be described.

Figure 11:
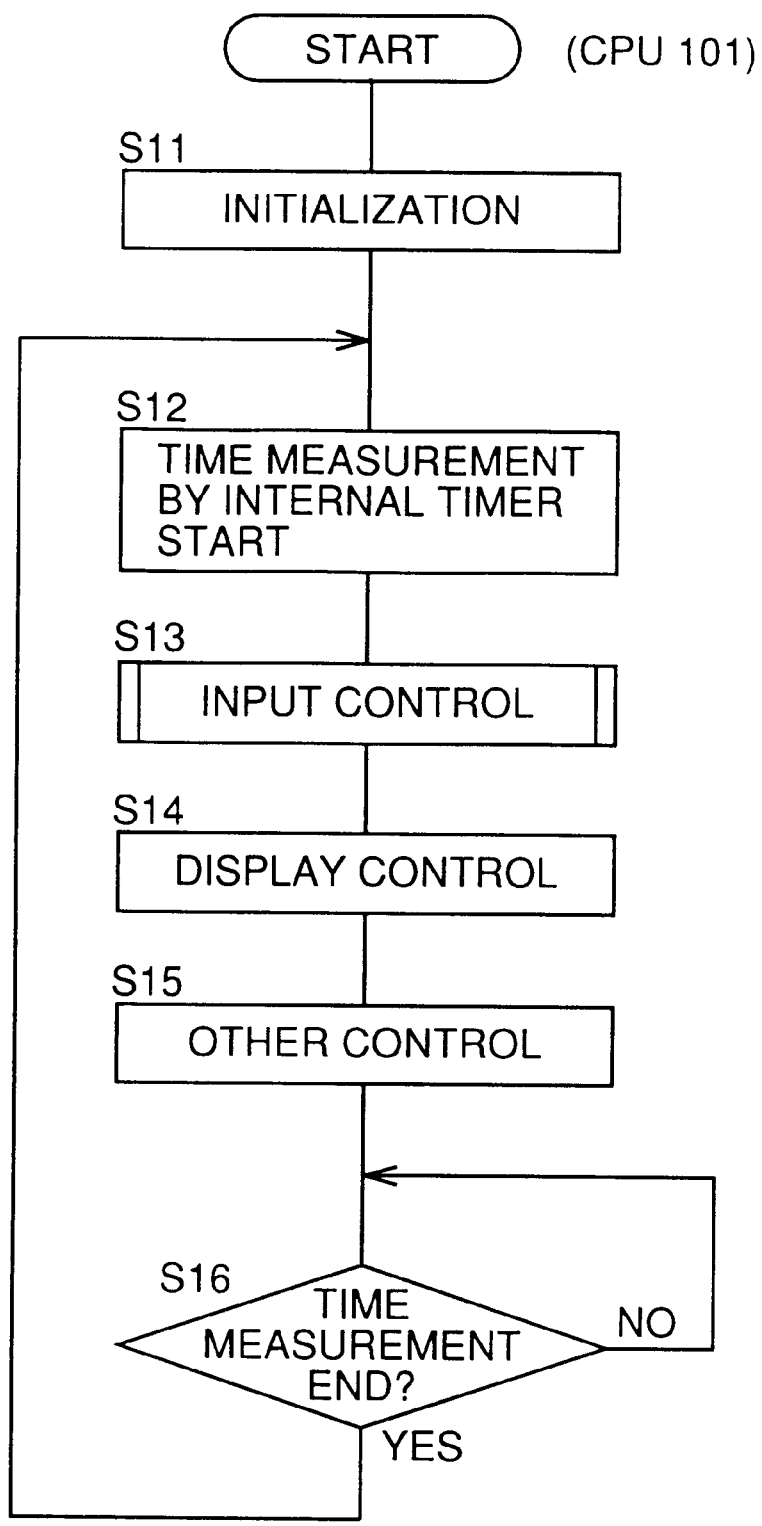
FIGS. 11 to 16 are flow charts showing main routines executed by CPUs 101 to 106, respectively.

FIG. 11 is a flow chart of the main routine executed by CPU 101. CPU 101 controls various input keys on operation panel OP, input signals from various sensors, and outputs to indicating portions on operation panel OP.

When the control starts, initialization is performed (step S1). An internal timer is set and time measurement starts, so as to make constant the time for processing one routine (step S12).

Control of input signals from various switches on operation panel OP and from various sensors in the copying machine is performed (step S13). Control of display on liquid crystal display panel on operation panel OP and indication on indicating elements is performed (step S14) and control of other internal mechanism is performed (step S15). The flow waits for the end of time measurement by the internal timer (step S16), and then the flow returns to step S12. Communication with other CPUs 102 to 106 is performed by interruption.

Figure 12:
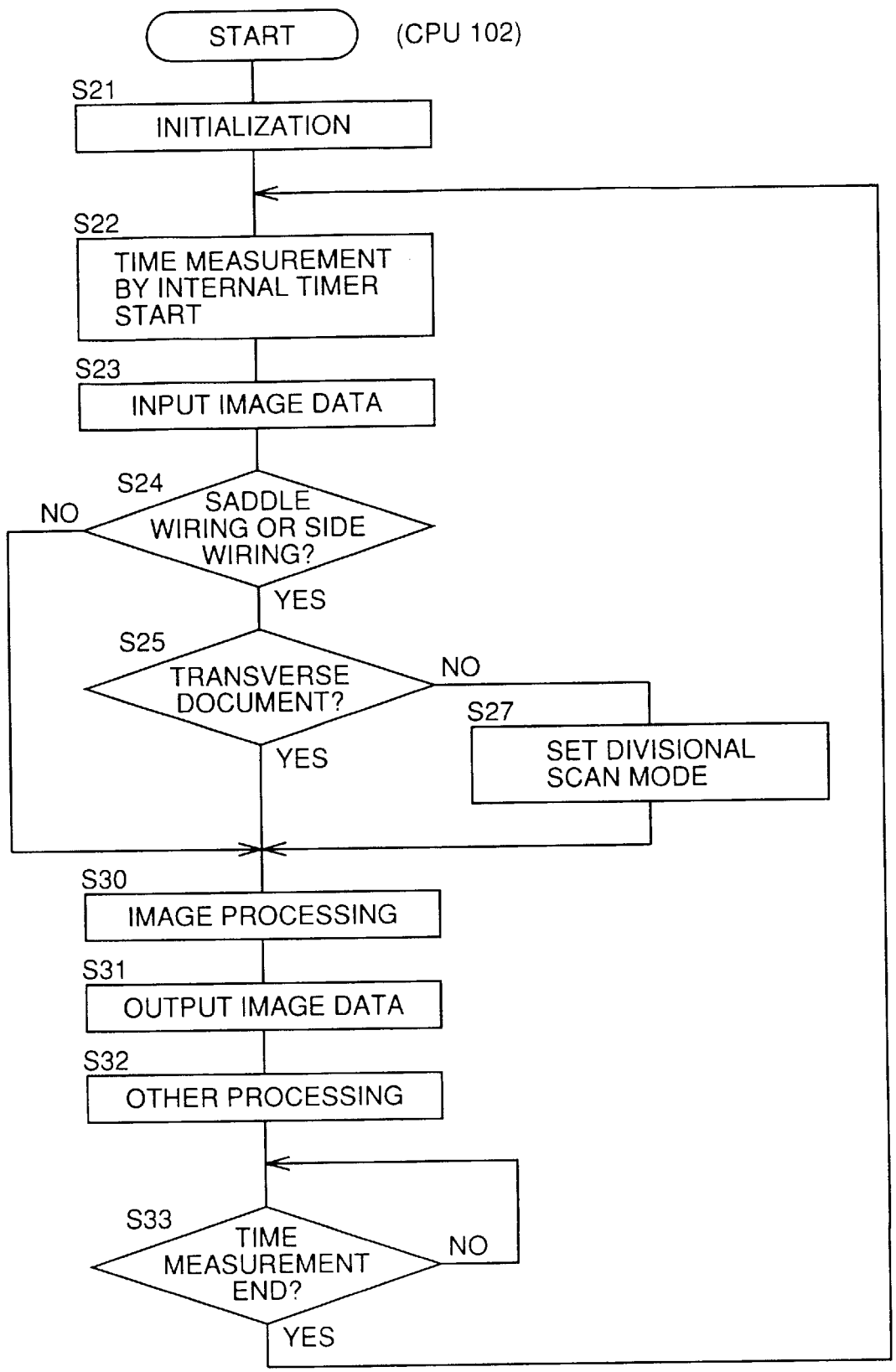

FIG. 12 is a flow chart of the main routine executed by CPU 102 which governs image processing. First, initialization is performed (step S21), time measurement is started by setting the internal timer (step S22), and image data input process is performed (step S23).

Whether the bookbinding mode (double-leaved side wiring mode or saddle wiring mode) is selected or not is determined (step S24). If selected, the direction of the document placed (longitudinal or transverse) is determined (step S25). If the direction of the document is not transverse, it is determined that the document is a two-page spread, and a divisional scanning mode is set (step S27). If it is determined in step S24 that the bookbinding mode is not selected, the flow immediately returns to step S30.

Thereafter, image processing, output of image data and other processing are performed (steps S30 to S32). At the end of time measurement by the internal timer (step S33), the flow returns to step S22.

Figure 13:
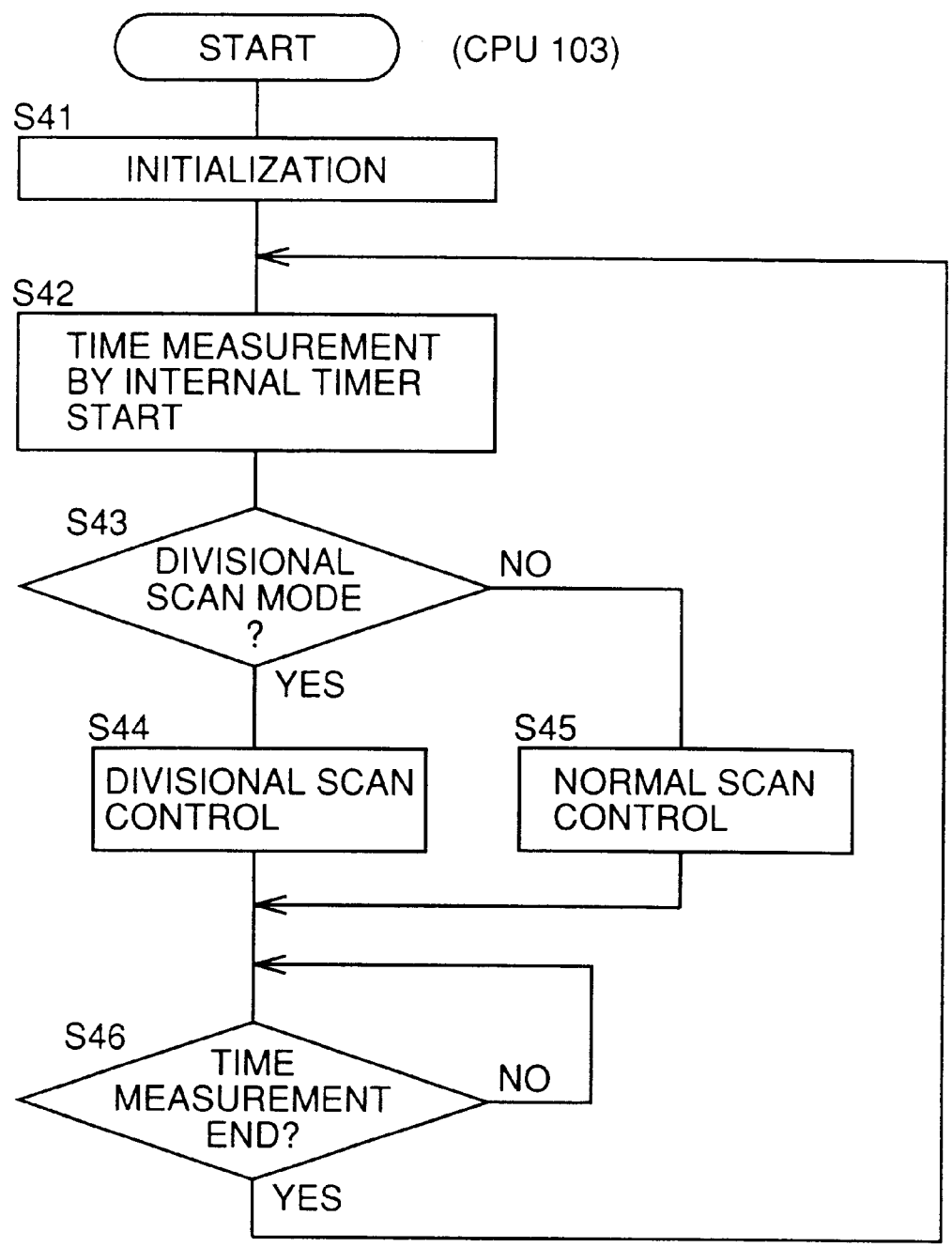

FIG. 13 is a flow chart of the main routine executed by CPU 103 which controls driving of the scanning system. When the control starts, initialization is performed (step S41), and time measurement is started by setting the internal timer (step S42).

Whether or not it is a divisional scan mode is determined (step S41). If it is, divisional scanning is performed (step S44) and if not, normal scanning control is performed (step S45). At the end of time measurement by the internal timer (step S46), the flow returns to step S42.

Figure 14:
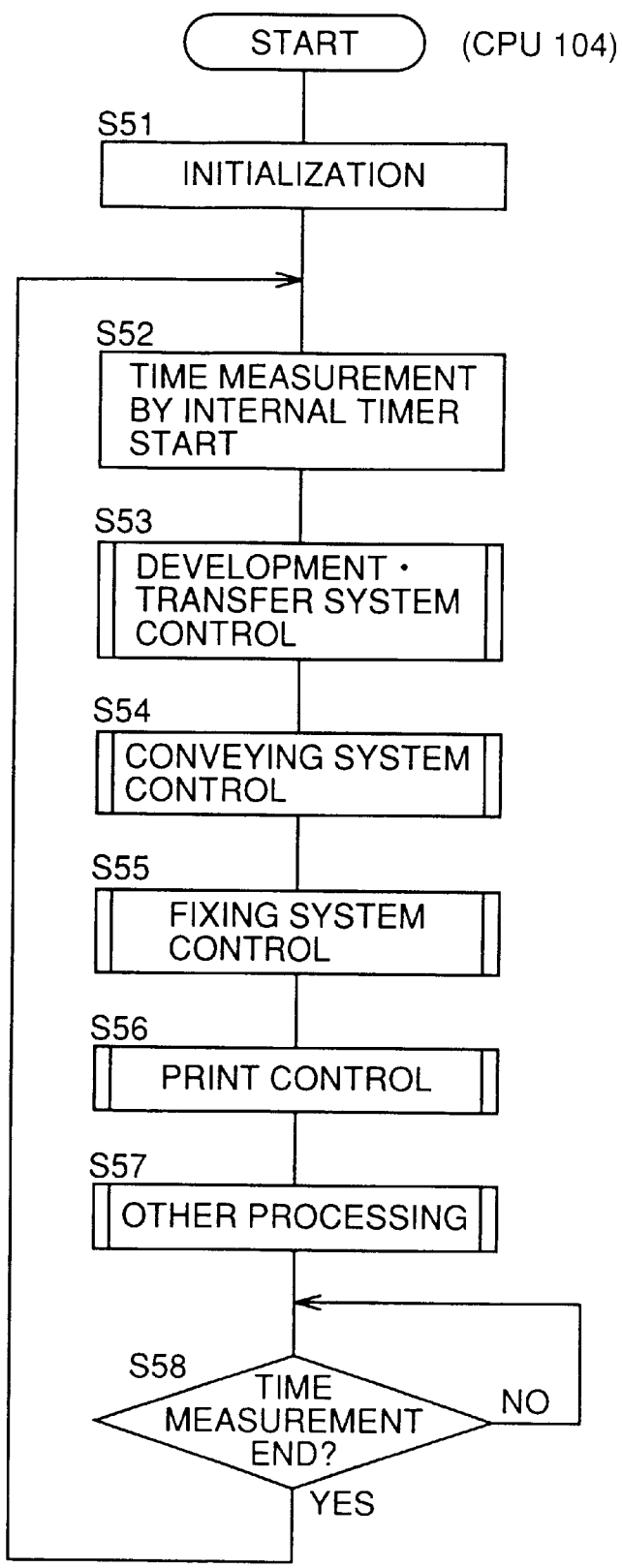

FIG. 14 is a flow chart of the main routine executed by the CPU 104. CPU 104 controls the printing unit, the laser optical system, image forming system, printer controller and so on. When control starts, initialization is performed (step S51), and time measurement is started by setting internal timer (step S52).

Thereafter, developing and transferring system including developer 4, transfer charger 7 and separation charger 8 are controlled (step S53), recording paper conveying system is controlled (step S54), fixing system including fixing roller 9 is controlled (step S55), printing unit 40 is controlled (step S56) and other processings are performed (step 57). Thereafter, at the end of time measurement by the internal timer (step S58), the flow returns to step S52.

In the process of step S54 controlling the conveying system, the size of the recording paper is detected by size detection sensors SE11 and S12. Paper re-feeding path length, interval between recording sheet and size of the recording paper are calculated by CPU 104, and the number M of sheets which can be stacked to the re-feeding path is determined based on the result of calculation. Since the re-feeding path length and the interval between recording sheet are constant, the number of sheets to be fed is determined based on the size of the recording paper.

Figure 15:
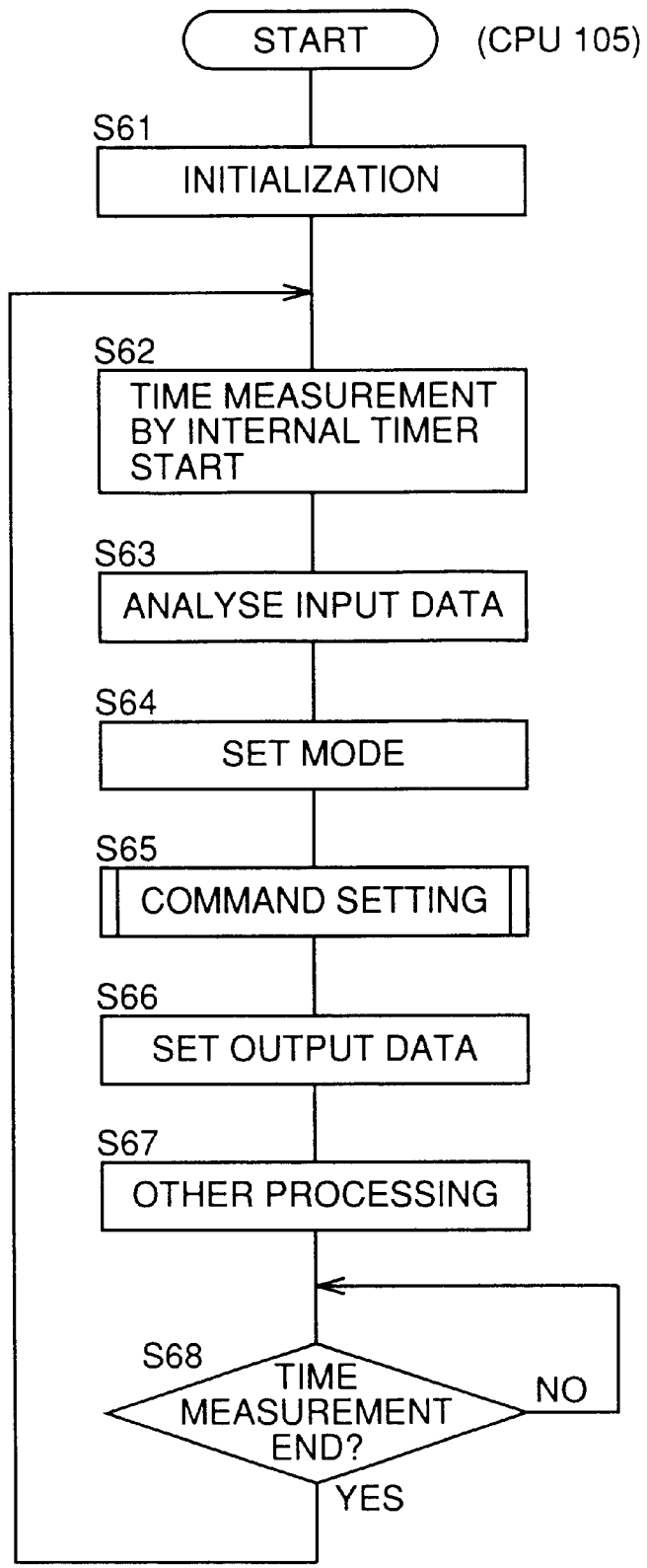

FIG. 15 is a flow chart of the main routine executed in CPU 105. CPU 105 sets commands of activation and stop as well as operation mode of other CPUs, and controls overall operation of the copying machine 100. When the control starts, initialization is performed (step S61) and time measurement is started by setting the internal timer (step S62).

Thereafter, contents of various data input by interruption are analyzed (step S63), and when operation has been changed, mode setting process is performed (S64).

Thereafter, commands such as writing to the memory and read control in accordance with the copying mode are set (step S65), data to be output by interruption is set (step S66) and other processings are performed (step S67). Finally, at the end of time measurement by the internal timer (step S68), the flow returns to step S62.

Figure 16:
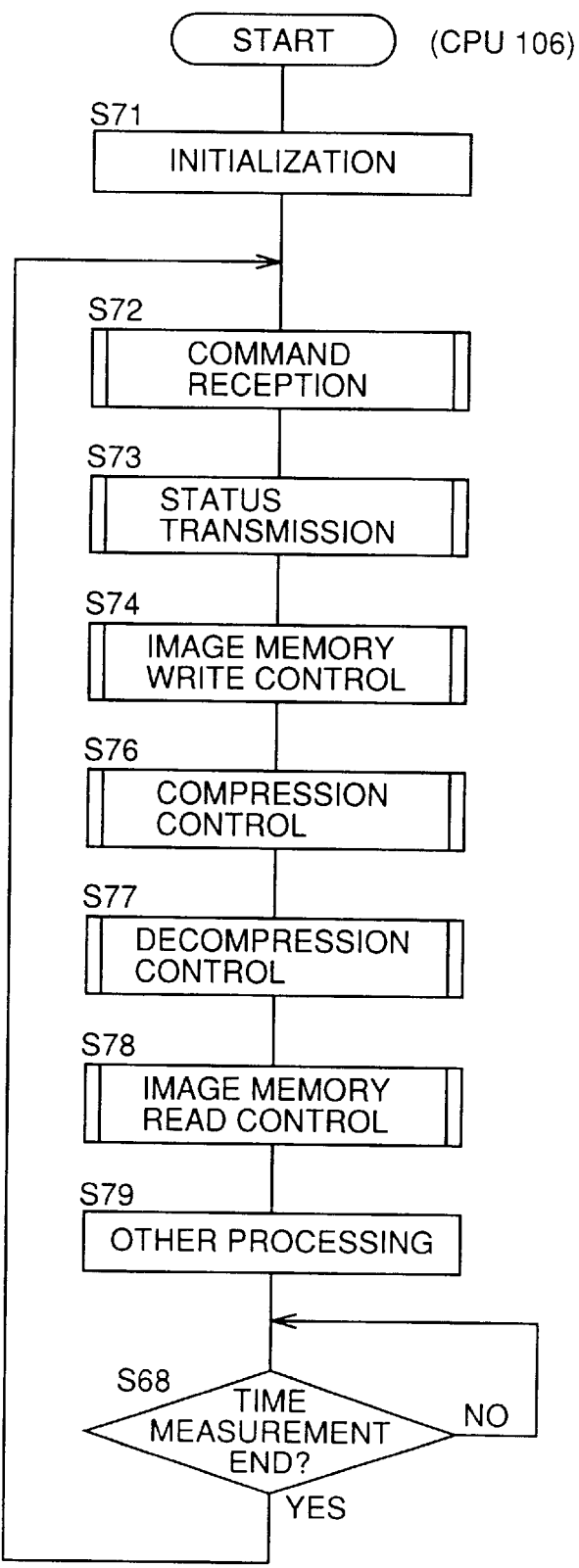

FIG. 16 is a flow chart of the main routine executed by CPU 106. CPU 106 controls memory unit 30. When the control starts, initialization is performed (step S71), commands from other CPUs are received (step S72), and a status is transmitted (step S73). Further, control of writing to the image memory (step S74), compression control (step S76), decompression control (step S77), read control from the image memory (step S78) and other processings (step S79) are performed. Finally, at the end of time measurement by the internal timer (step S68), the flow returns to step S72.

Figure 17:
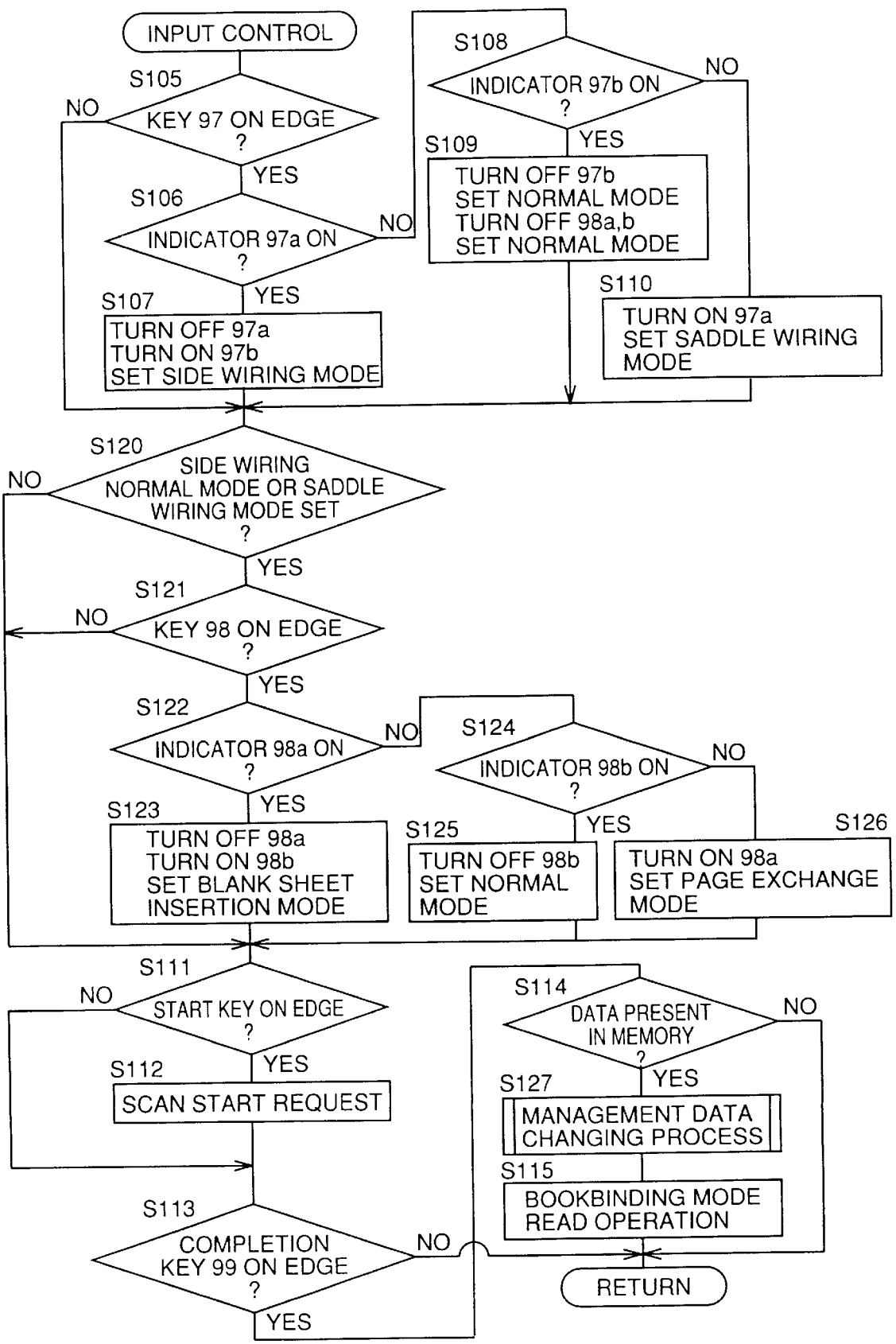
FIG. 17 is a flow chart showing details of an input signal control process.

FIG. 17 is a flow chart showing details of the input signal control shown as step S13 in the flow chart of FIG. 11.

When the flow proceeds to the input control subroutine of step S13 in the flow chart of FIG. 11, in step S105, an ON edge of binding mode setting key 97 is determined. Binding mode setting key 97 is for selecting the state of selection and setting of the bookbinding mode (double-leaved side wiring, saddle wiring or normal copying). In step S105, if the bookbinding mode setting key 97 is not an ON edge, the flow proceeds to step S120.

When bookbinding mode setting key 97 is at an ON edge in step S105, the flow proceeds to S106 in which lighting state of indicating portion 97a indicating selection of the saddle wiring mode is determined. It is it lit, indicating portion 97a is turned off in step S107, indicating portion 97b indicating selection of the double-leaved side wiring mode is lit, double-leaved side wiring mode is set and the flow proceeds to step S120.

When the indicating portion 97a is off at the determination of step S106, the state of lighting of indicating portion 97b is determined in step S108. If it is lit, indication portions 97b, 98a and 98b are turned off in step S109, normal mode is set, and the flow proceeds to step S120.

When indicating portion 97b is off in the determination at step S108, indicating portion 97a is lit in step S110 and saddle wiring mode is set, and the flow proceeds to step S120.

After the mode is set in this manner, in step S120, whether the bookbinding mode is set or not is determined. When the bookbinding mode is set, the flow proceeds to step S121, and determines bookbinding mode setting by the ON edge of setting key 98. When it is not set, the flow proceeds to step S111. When it is determined in step S121 that the setting key 98 is at an ON edge, the flow proceeds to step S122, and determines the state of lighting of indicating portion 98a which indicates selection of the page exchanging mode. When indicating portion 98a is lit, indicating portion 98a is turned off in step S123, indicating portion 98b indicating selection of the blank sheet inserting mode is lit thus setting the blank sheet inserting mode, and thereafter the flow proceeds to step S111.

When indicating portion 98a is off in the determination of step S122, the state of lighting of indicating portion 98b indicating the blank sheet inserting mode is determined in step S124. When indicating portion 98b is lit, the indicating portion 98b is turned off in step S125 to set the normal mode, and the flow proceeds to step S111.

In the determination of step S124, when indicating portion 98b is off, indicating portion 98a indicating selection of the page exchanging mode is lit in step S126 to set the page exchanging mode, and the flow proceeds to step S111.

In step S111, whether or not start key 96 on the operation panel instructing start of copying operation has been pressed or not is determined based on the ON edge of start key 96. When the start key 96 is not at the ON edge, the flow directly proceeds to step S113. When the start key 96 is at ON edge, a scan start request is issued in step S112 and the flow proceeds to step S113.

In step S113, whether or not all the documents have read or not is determined based on the ON edge of read completion key 99 on the operation panel, and in case of an ON edge, the flow proceeds to step S114. If not, the flow directly returns to the main routine.

In step S114, whether or not there is data in the image memory is confirmed. When there is data in the image memory, management data MT1 changing process is performed in step S127, binding mode reading operation is performed in step S115, and then the flow returns to the main routine. In the absence of any data in the image memory, the flow directly returns to the main routine. The management data changing process will be described in detail later.

Figure 18:
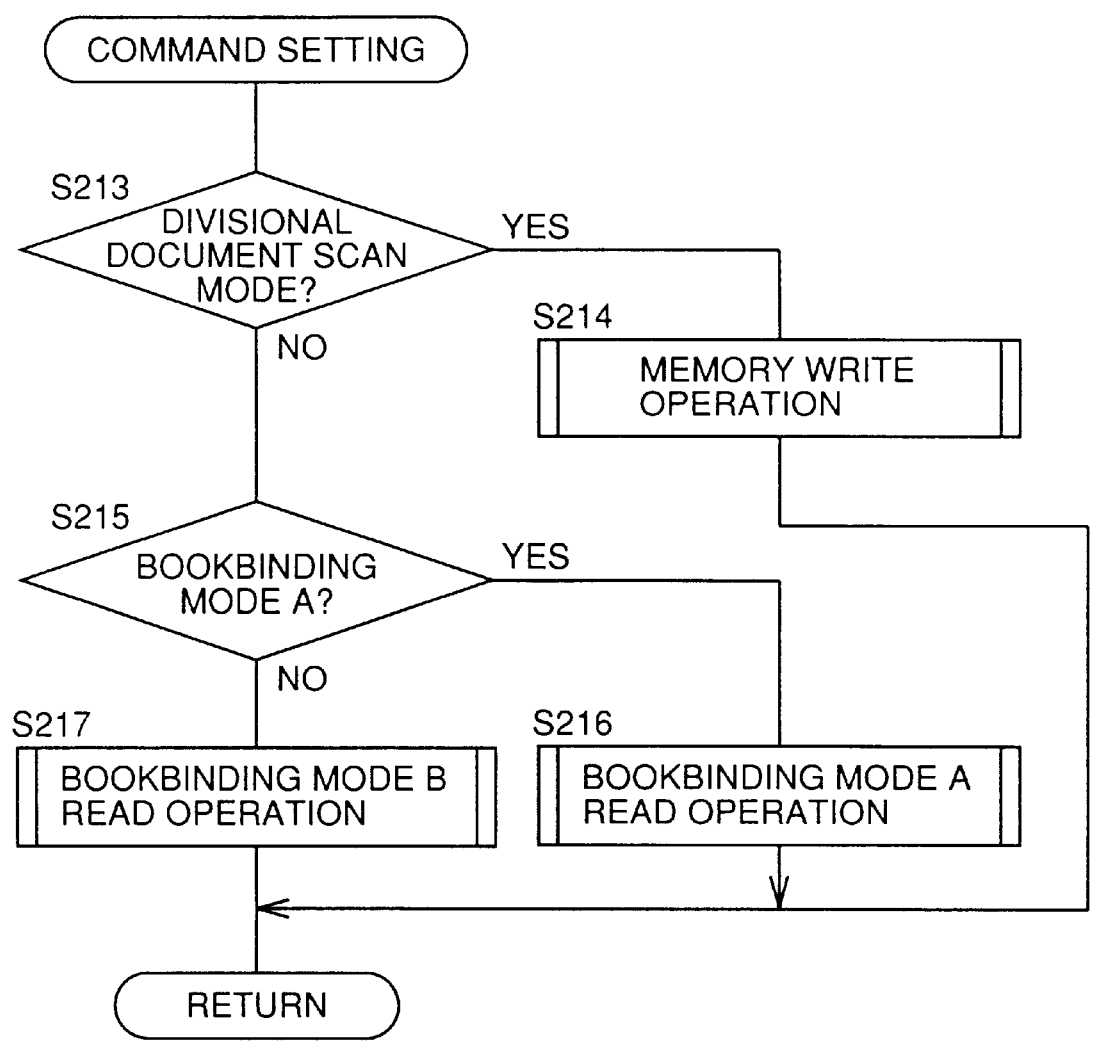
FIG. 18 is a flow chart showing details of command setting.

FIG. 18 is a flow chart showing details of command setting shown as step S65 in the flow chart of FIG. 15.

When the flow proceeds to the command setting subroutine of step S65 in the flow chart of FIG. 15, first, in step S213, whether or not it is a divisional document scan mode or not is determined. If it is, the flow proceeds to step S214 in which command necessary for memory writing operation are set, and the flow returns to the main routine.

If it is not the divisional scanning mode in the determination of step S213, the flow proceeds to step S215 in which whether it is the bookbinding mode A (double-leaved side wiring mode) is determined. If it is the bookbinding mode A in step S216, a command necessary for the operation in the bookbinding mode A is set. If it is not the bookbinding mode A, it means that it is the bookbinding mode B (saddle wiring), and therefore a command necessary for the operation in the bookbinding mode B is set in step S217, and the flow returns to the main routine.

Figure 19:
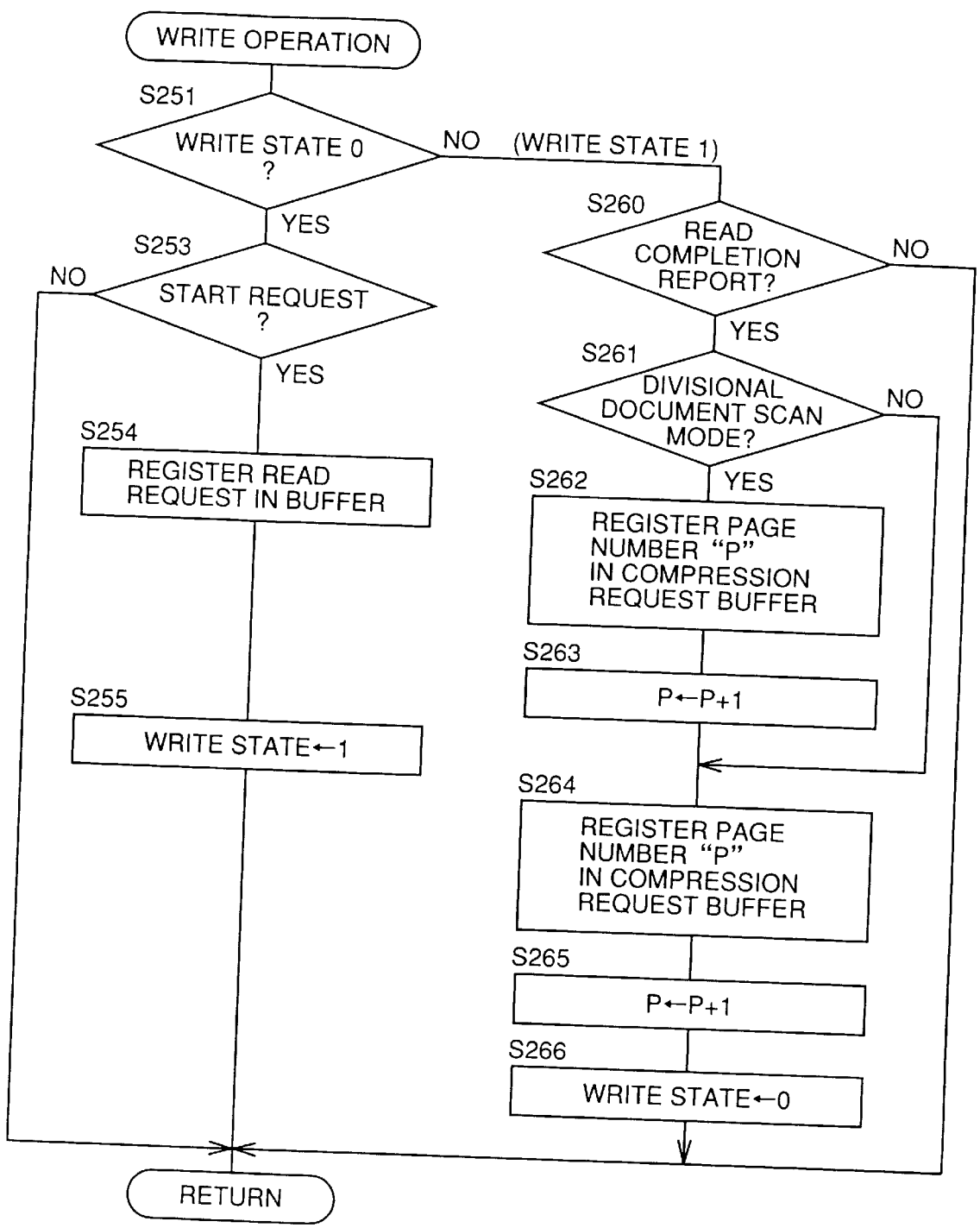
FIG. 19 is a flow chart showing details of command setting in memory writing operation.

FIG. 19 is a flow chart showing details of command setting necessary for memory writing operation in the divisional document scanning mode shown as step S214 in the flow chart of FIG. 18.

In the memory writing subroutine, first, in step S251, whether or not a write state is 0 is determined. If the state is determined to be 0 in step S251, the flow proceeds to S253 in which whether a start request has been issued from CPU 101 is determined. If it is determined in step S253 that there is a start request, a read request is registered in a read request buffer memory in step S254. Thereafter, in step S255, the write state is updated to 1, and the flow returns to the main routine.

When it is determined in step S251 that the state is 1, whether there is a report indicating read completion from CPU 102 is determined in step S260, and in the absence of read completion report, the flow returns to the main routine. When there is a read completion report, in step S261, whether it is divisional document scan or normal scan is determined based on the size of the document received as a parameter thereof.

When it is the divisional document scanning mode, in step S262, the page number P is registered in a compression request buffer in step S262, and page number P if updated by one in step S263. This process is executed again in steps S264 and S265. Namely, in the divisional document scanning mode, the process of registering page number P in the compression request buffer and updating the page number P by one is performed twice.

When it is determined in step S261 that it is not the divisional document scanning mode, then the process of registering page number P in compression request buffer in step S264 and updating page number by one in step S265 is performed once. Finally, in step S266, the write state is updated to 0, and the flow returns to the main routine.

The contents of the read request buffer and compression request buffer are set to be output in step S66 of the flow chart shown in FIG. 15.

By the above described process, compression data corresponding to the page of the document is registered in the management table shown in FIG. 5.

Figure 20:
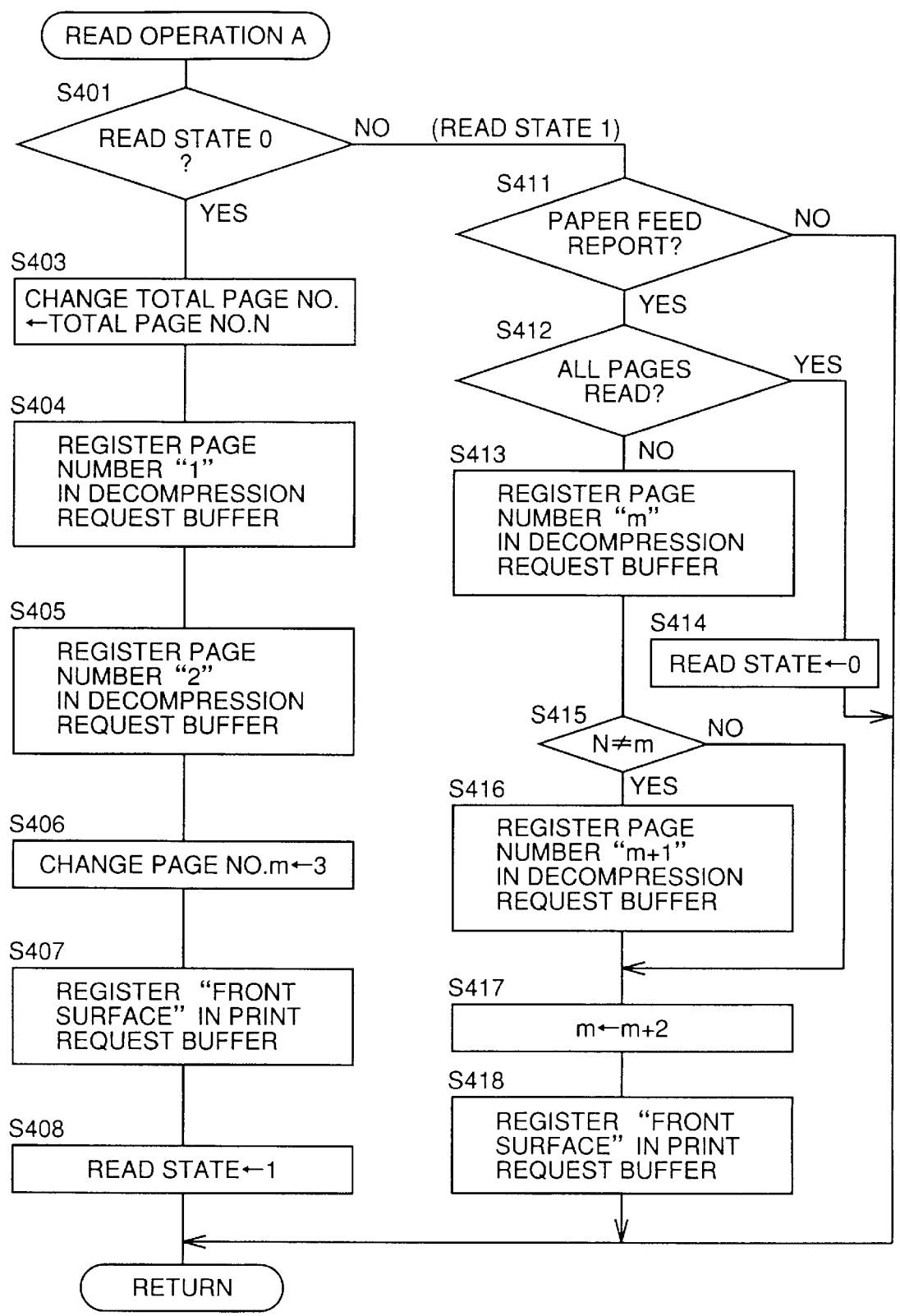
FIG. 20 is a flow chart showing details of command setting in memory reading in bookbinding mode A.

FIG. 20 is a flow chart showing details of command setting necessary for memory reading operation in the bookbinding mode A (double-leaved side wiring) shown as step S216 in the flow chart of FIG. 18. Here, decompression request and print request are set such that the output as shown in FIG. 8 is realized.

First, in step S401, whether read state is zero or not is determined. If the read state is zero, in step S403, the total number of pages N written in the memory is set as a variable indicating the total number of pages of the image data. Thereafter, in step S404, page number "1" is registered in decompression request buffer in step S404, and page number "2" is registered in the decompression request buffer in step S405.

The decompression request buffer is read in the process of setting output data in step S66 of FIG. 15, and if there is a registered number, it is output.

Thereafter, in step S406, for the next read state processing, the variable m indicating the page number is set to "3", a printer request for the surface of the sheet of recording paper is registered in the print request buffer in step S407, the read state is updated to 1 in step S408 and the flow returns to the main routine.

As the print request is registered in the compression request buffer, the page number "m" registered together with the decompression request is added as a parameter, and transmitted to CPU 106. Then CPU 106 takes out compressed data and from the management table of FIG. 5 and decompresses the same, based on the parameter. In this example, decompression request for the page numbers "1" and "2" are transmitted to CPU 106.

In the print request buffer, a parameter indicating whether the surface to be printed is the front surface or the rear surface of the recording paper and the information including the parameter is transmitted to CPU 104. CPU 104 operates in accordance with the parameter. Namely, when it is the front surface, the copying machine is controlled such that the paper is fed from paper feed cassette 80a or 80b. If it is the rear surface, it transmits a command to CPU 108 so that paper is fed from re-feeding portion 600.

When the read state is 1 in the determination of step S401, first, in step S411, whether there is a paper feed report is determined. If the paper feed report has not yet been received in the determination of step S411, updating of the decompression request buffer and updating of the print request buffer are not performed and the flow directly returns to the main routine.

In the determination of step S411, when the paper feed report has been received, whether all the pages have been read or not is determined in step S412. If not, in step S413, a decompression request buffer page number "m" is registered. If it is determined in step S412 that all the pages have been read, it means that all the sheets of recording paper have been fed. Therefore, read state is updated to 0 in step S414 and the flow returns to the main routine.

Further, in step S415, whether the total number of pages is an odd number or not and whether the last page has been registered in the compression request buffer are determined. More specifically, when N≠m (total number of pages ≠ last page number m), in step S416, the page number "m+1" is registered in the decompression request buffer, and then the flow proceeds to step S417. When N=m (total number of pages=last page number m), then the flow skips the step S416 and proceeds to step S417. Then, in step S417, the page number m is updated by 2 (m+2), and in step S418, a print request for the front surface of the recording paper is registered in the print request buffer, and then the flow returns to the main routine.

Figure 21:
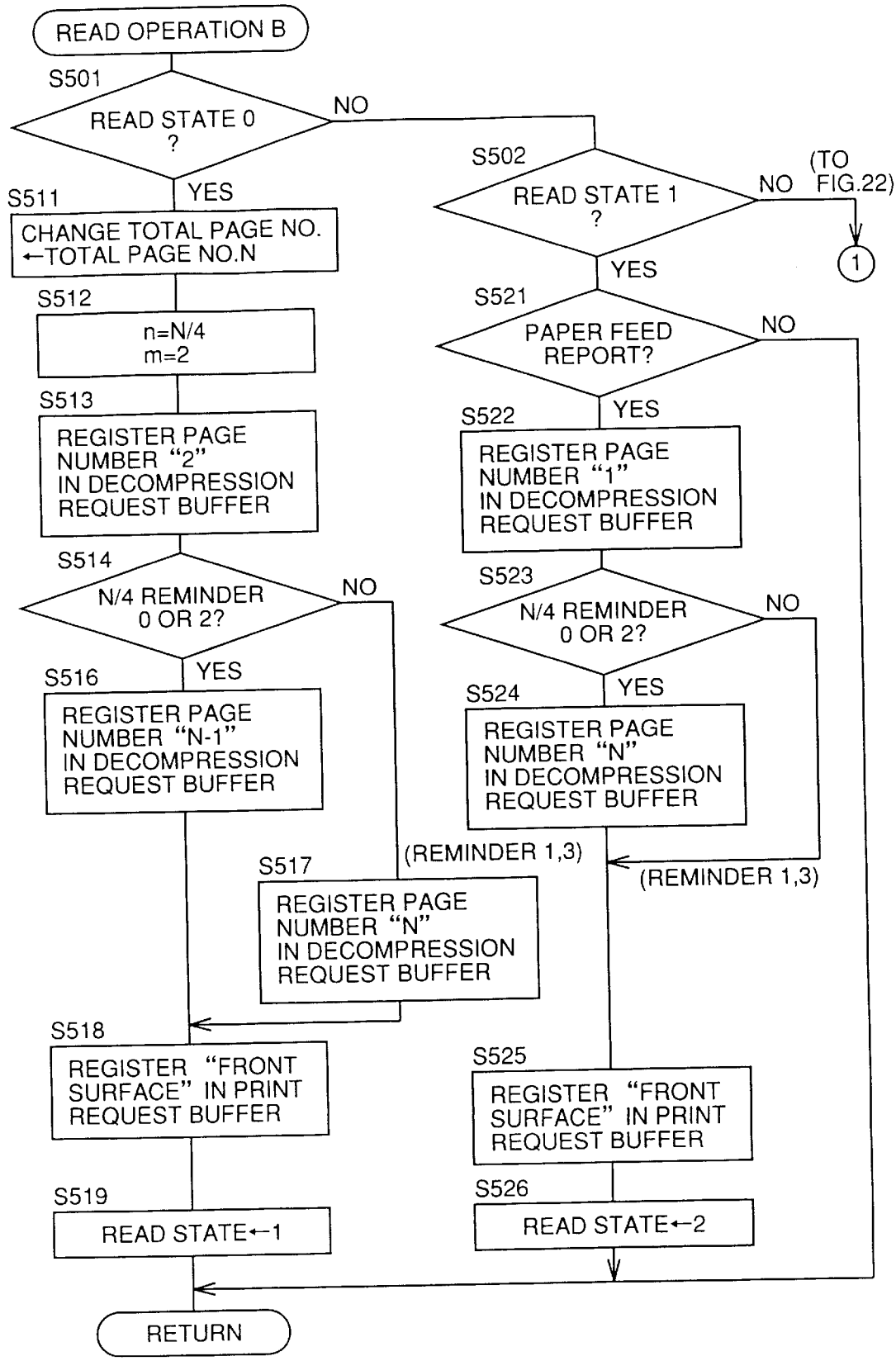
FIGS. 21 to 23 are flow charts showing details of command setting of memory reading in bookbinding mode B.
Figure 22:
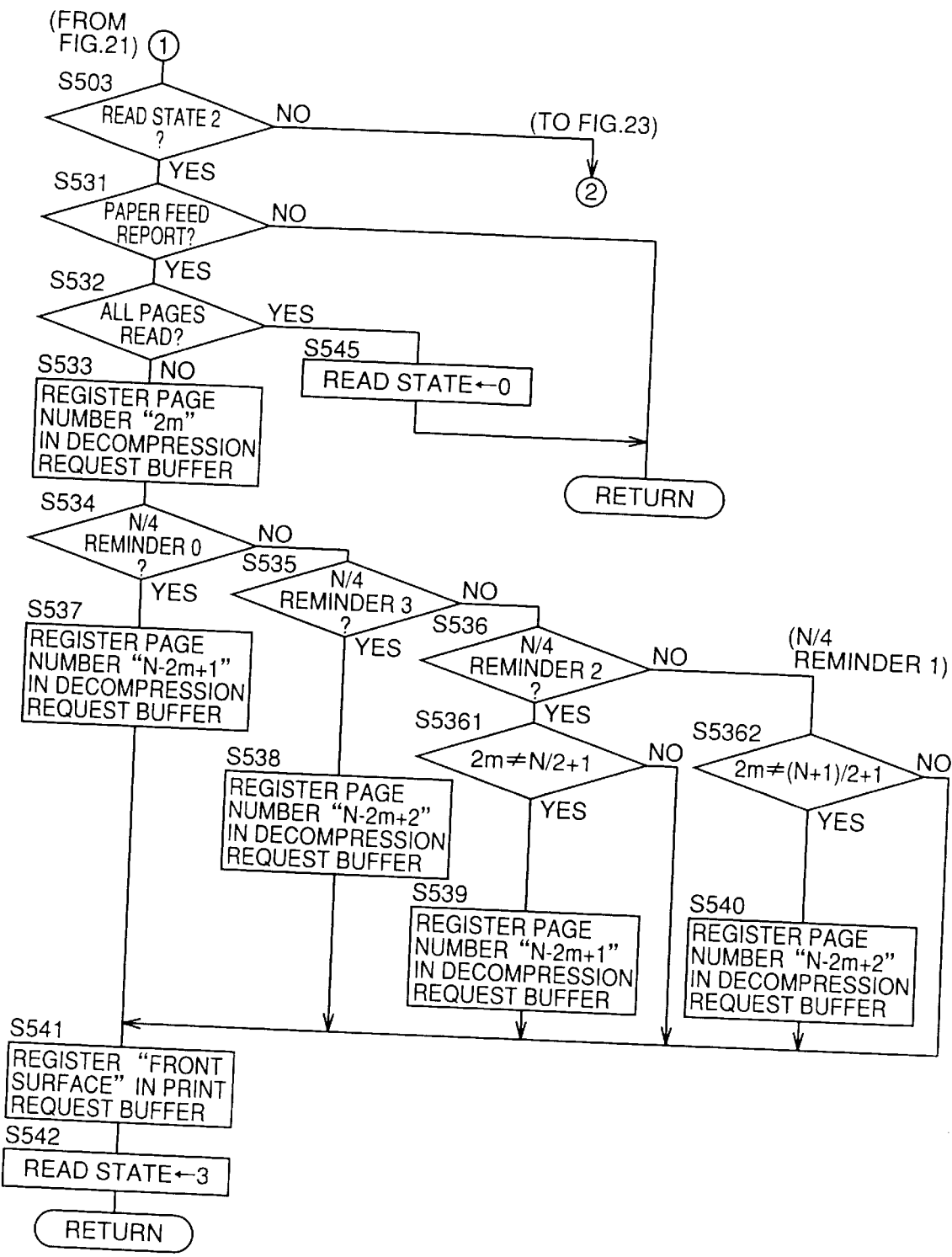
Figure 23:
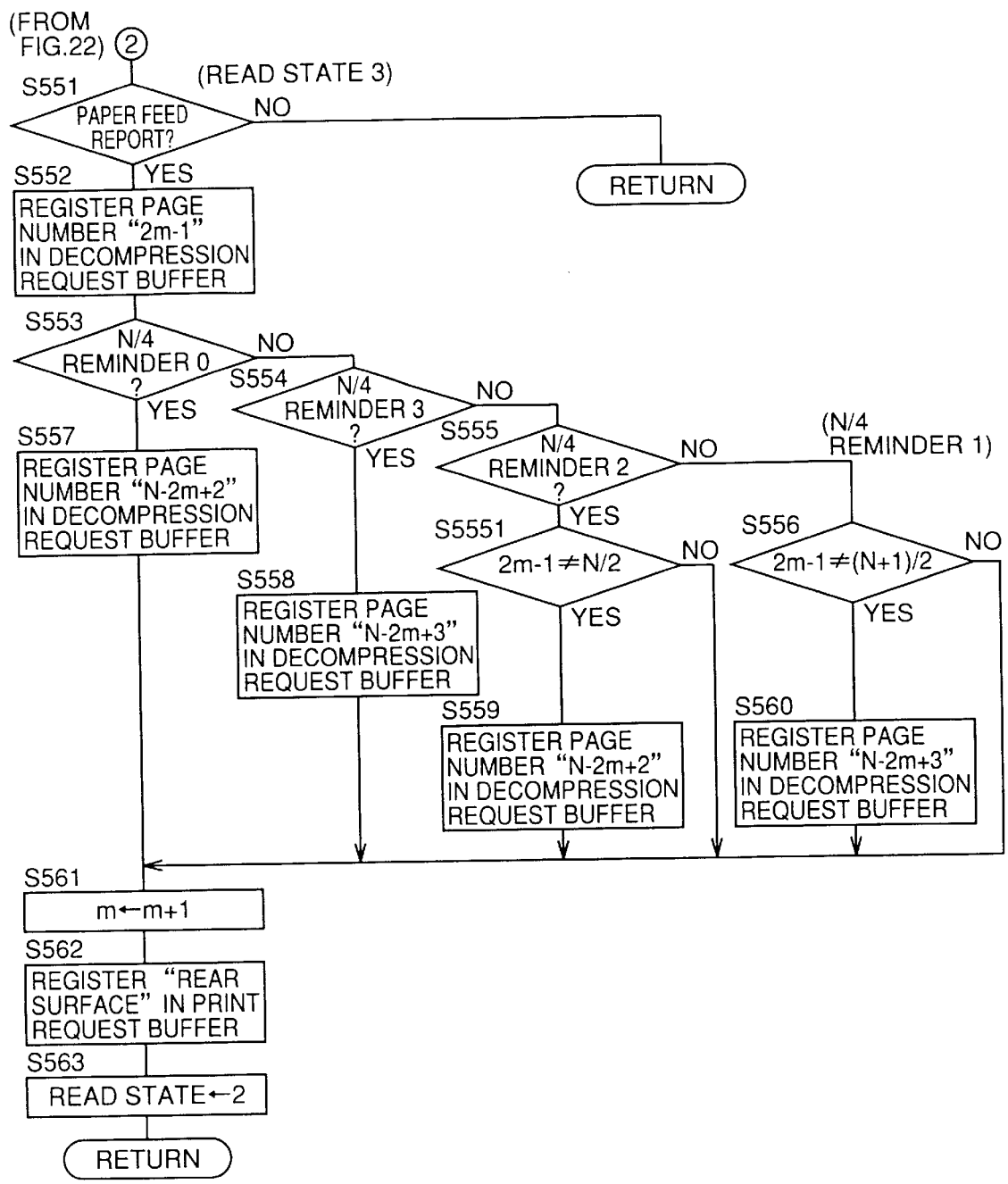

FIGS. 21 to 23 are flow charts showing details of command setting necessary for memory reading operation in the bookbinding mode B (saddle wiring) shown as step S217 in the flow chart of FIG. 18. Here, the decompression request and the print request are set such that the output as shown in FIG. 9 is realized.

In the subroutine of reading operation B, the read state is determined in steps S501, S502 and S503, and thereafter the flow proceeds to the corresponding read state number.

In step S501, when the read state is determined to be 0, the flow proceeds to step S511, in which the total number of pages N written in the memory is set as a variable indicating the total number of pages of the image data.

Thereafter, in step S512, an integer value of the quotient of division of the total number of pages N by 4 is input to variable n, and 2 is input to variable m indicating the order of the output of the recording paper. In step S513, the page number "2" is registered in the decompression request buffer.

Thereafter, in step S514, a reminder when the total number of pages N is divided by 4 is determined. When the reminder is 0 or 2, it corresponds to the example of FIG. 9(a) or (c). Therefore, in step S516, the page number "N−1" is registered in the decompression request buffer. When the reminder is 1 or 3, it corresponds to the example of FIG. 9(b) or (d). Therefore, the page number "N" is registered in the compression request buffer in step S517.

In step S518, a print request corresponding to the front surface of the recording sheet is registered in the print request buffer, read state is updated to 1 in step S519, and the flow returns to the main routine.

In step S502, when it is determined that the read state is 1, the flow proceeds to step S521 in which whether a paper feed report has been received or not is determined. When the read state is not determined to be 1 in step S502, the flow proceeds to step S503 of FIG. 22. If it is determined in step S521 that the paper report has not yet been received, the flow directly returns to the main routine. If it is determined that the paper feed report has been received, page number "1" is registered in decompression request buffer in step S522 for the processing corresponding to the rear surface of the first sheet of recording paper.

Thereafter, in step S523, reminder of the division of the total number of pages N by 4 is determined. If the reminder is 0 or 2, it corresponds to the example of FIG. 9(a) or (c). Therefore, the page number "N" is registered in the compression request buffer in step S524. When the reminder is neither 0 nor 2, that is, when the reminder is 1 or 3, it corresponds to the example of FIG. 9(b) or (d). Therefore, the page number is not registered in the compression request buffer.

Thereafter, in step S525, a print request for the rear surface of the recording sheet is registered in the print request buffer, the read state is updated to 2 in step S526 and the flow returns to the main routine.

The control of read state 2 shown in FIG. 22 will be described. In step S503, if it is determined that the read state is 2, in step S531, whether or not a paper re-feeding report has been received in response to a print request to the rear surface of the recording sheet is determined. In step S503, if read state is not determined to be 2, the flow returns to step S551 of FIG. 23. If it is determined in step S531 that the paper feed report has not yet been received, updating of decompression request buffer and updating of print request buffer are not performed, and the flow directly returns to the main routine. In step S531, when it is determined that the paper feed report has been received, it is determined in step S532 whether or not all the pages has been read. If not, the page number "2n" is registered in the decompression request buffer in step S533. When it is determined in step S532 that all the pages has been read, the read state is updated to 0 in step S545 and the flow returns to the main routine.

Thereafter, in steps S534, 535 and S536, what is the reminder of division of the total number of pages N by 4 is determined. If it is determined in step S534 that the reminder is 0, it corresponds to the example of FIG. 9(a). Therefore, in step S537, the page number "N−2m+1" is registered in the decompression request buffer, and the flow proceeds to step S541.

When it is determined in step S534 that the reminder is not 0, the flow proceeds to step S535. When it is determined in step S535 that the reminder is 3, it corresponds to the example of FIG. 9(b). Therefore, in step S538, page number "N−2m+2" is registered in the decompression request buffer, and the flow proceeds to step S541.

When it is determined in step S535 that the reminder is not 3, the flow proceeds to step S536. When it is determined in step S536 that the reminder is 2, it corresponds to the example of FIG. 9(c). Therefore, in step S5361, whether or not the page 2m is N/2+1 is determined. If the page 2m is not N/2+1, then page number "N−2m+2" is registered in decompression request buffer in step S539, and the flow proceeds to the step S541. When the page 2m is N/2+1, the flow directly proceeds to step S541.

When it is determined in step S536 that the reminder is not 2, that is, when the reminder is 1, the flow proceeds to the step S5362. When the reminder is 1, it corresponds to the example of FIG. 9(d). Therefore, in step S5362, whether or not the page 2m is (N+1)/2+1 is determined. If page 2m is not (N+1)/2+1, page number "N−2m+2" is registered in decompression request buffer in step S540, and the flow proceeds to the step S541. When the page 2m is (N+1)/2+1, the flow directly proceeds to step S541.

Thereafter, in step S541, print request for the front surface of the sheet of recording paper is registered in the print request buffer, in step S542, the read state is updated to 3, and the flow returns to the main routine.

Control of the read state 3 shown in FIG. 23 will be described. The process when the read state is 3 represents the process of reading data from the memory for printing on the rear surface of the sheet, which is performed after the printing on the front surface of the sheet is completed.

In the control of read state 3, first, in step S551, whether or not paper feed report has been received is determined. If the paper report has been received, page number "2m−1" is registered in decompression request buffer in step S552. In the determination of step S551, when the paper feed report has not yet been received, updating of the decompression request buffer and updating of the print request buffer are not performed, and the flow directly returns to the main routine.

Then, in steps S553, S554 and S555, what is the reminder of the division of the total number of pages N by 4 is determined. When the reminder is determined to be 0 in step S553, it corresponds to the example of FIG. 9(a). Therefore, page number "N−2m+2" is registered in the decompression request buffer in step S557, and the flow proceeds to step S561.

When it is determined that the reminder is not 0 in step S553, the flow proceeds to step S554. When the reminder is determined to be 3 in step S554, it corresponds to the example of FIG. 9(b). Therefore, page number "N−2m+3" is registered in the decompression request buffer in step S558, and the flow proceeds to step S561.

When it is determined that the reminder is not 3 in step S554, the flow proceeds to step S555. When it is determined that the reminder is 2 in step S555, it corresponds to the example of FIG. 9(c), and therefore whether page 2m−1 is N/2 is determined in step S5551. When page 2m−1 is not N/2, page number "N−2m+2" is registered in decompression request buffer in step S559, and the flow proceeds to step S561. When page 2n−1 is N/2, the flow directly proceeds to step S561.

When it is determined in step S555 that the reminder is not 2, that is, when the reminder is 1, the flow proceeds to the step S556. When the reminder is 1, it corresponds to the example of FIG. 9(d). Therefore, in step S556, whether page 2n−1 is (N+1)/2 is determined. When page 2m−1 is not (N+1)/2, then page number "N−2m+3" is registered in decompression request buffer, and the flow proceeds to the step S561. When page 2m−1 is (N+1)/2, then the flow directly proceeds to step S561.

Thereafter, the number m of the sheet of recording paper is updated by 1 in step S561, print request for the rear surface of the sheet of recording paper is registered in the print request buffer in step S562, read state is updated to 2 in step S563, and the flow returns to the main routine.

Figure 24:
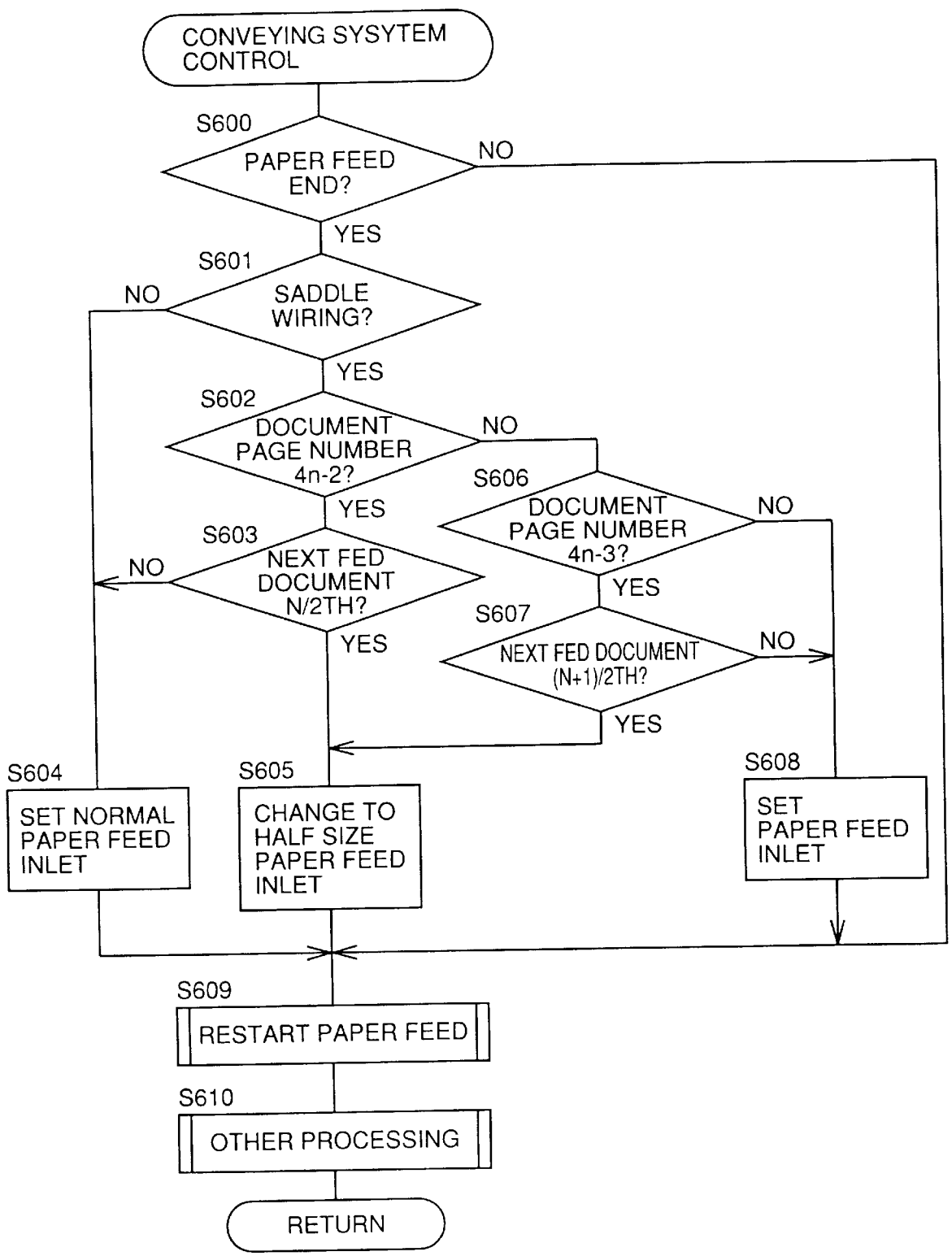
FIG. 24 is a flow chart showing details of control of conveying system.

FIG. 24 is a flow chart showing control of the conveying system by the CPU 104 shown as step S54 in the flow chart of FIG. 14. Here, a portion for setting feeding of paper having half the size of the central paper in the saddle wiring mode, as shown in (c) and (d) of FIG. 9 will be described in detail.

First, in step S600, whether or not it is an edge of paper feed completion is determined. It is an edge of paper feed completion, the flow proceeds to step S601. If paper feed has not yet been completed, the flow proceeds to step S609.

In step S601, whether or not it is the saddle wiring mode is determined. If it is the saddle wiring mode, the flow proceeds to step S602, and if it is not the saddle wiring mode, normal paper feed inlet is set in step S604, and the flow proceeds to step S609.

In step S602, whether the number of documents is divisible by 4 with reminder 2 is determined. If it is determined in step S602 that the number of documents is divisible by 4 with reminder 2, the flow proceeds to step S603 in which whether the sheet which is fed next is the central sheet or not is determined. In other words, whether or not the sheets to be fed next is the N/2th copy or not is determined. If it is determined to be the central sheet, in step S605, the paper feed inlet is switched to the one which feeds the sheet of recording paper having half the size of the normally fed sheet. When it is determined in step S603 that the sheet to be fed next is not the central sheet, normal paper feed inlet is set in step S604 and the flow proceeds to step S609.

In step S602, when it is determined that the number of documents is not divisible by 4 with reminder 2, the flow proceeds to step S606 in which whether the number of documents is divisible by 4 with reminder 3 is determined. If the number of documents is divisible by 4 with reminder 3, the flow proceeds to step S607 in which whether the sheet of paper to be fed next is the central sheet is determined. In other words, whether the sheet to be fed next is the copy of (N+1)/2th copy is determined. If is determined to be the central sheet, in step S605, the paper feed inlet is switched to that one which feeds a sheet of recording paper of half the size of the generally fed sheets. When it is determined in step S606 that the number of documents is not divisible by 4 with reminder 3, or when it is determined in step S606 that it is not the central sheet, the flow proceeds to step S608 in which normal paper feed inlet is set, and the flow proceeds to step S609.

Thereafter, paper feeding is started in step S609, control of other conveying system is performed in step S610, and then the flow returns to the main routine.

Figure 25:
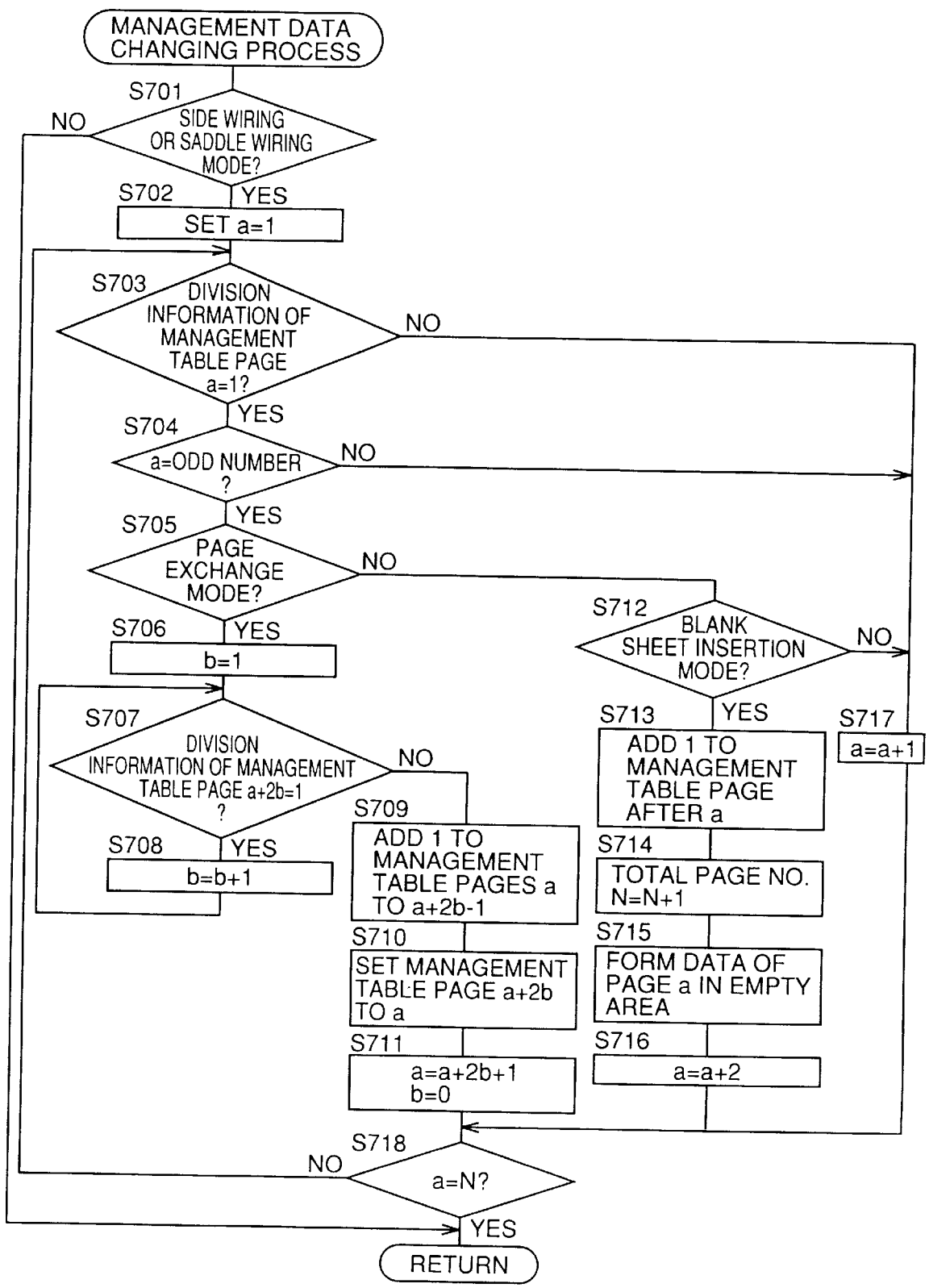
FIG. 25 is a flow chart showing details of control for changing management data.

FIG. 25 is a flow chart showing details of the management data changing process shown at step S127 in the flow chart of FIG. 17. Here, control is performed so as to provide a two-page spread image of a longitudinally fed document in the saddle wiring mode as shown in (a) and (b) of FIG. 10. Examples of the change in the management table are shown in FIGS. 26A, 26B, 27A and 27B. FIGS. 26A and 26B are examples of the management table in the page exchanging mode, and FIGS. 27A and 27B show examples of the management table in the blank inserting mode. In FIGS. 26A, 26B, 27A and 27B, numbers on the "page" column represents the page number of the stored image, and image output is performed in accordance with the page number. The number in the "division" column represents a division information flag. The division information flag indicates an image for which a two-page spread image should be formed. It is set page by page for an image which should be formed in two-page spread, by an input from the operation panel OP or by automatic setting in accordance with the direction of feeding the document. In the tables of FIGS. 26A, 26B, 27A and 27B, flags are set such that pages 3 and 4 are processed to be two-page spread as shown in (a) and (b) of FIG. 10.

In the management data changing process subroutine, first, in step S701, whether or not the bookbinding mode is selected is determined. If not, the flow directly returns to the main routine. When the bookbinding mode is selected, the flow proceeds to step S702 in which 1 is set in a variable a.

Thereafter, in step S703, whether or not the flag of division information of page a in the management table is set or not is determined. If the division information flag is set, in step S704, whether or not the variable a is an odd-number or even-number is determined. When the variable a is an odd-number, the flow proceeds to step S705 in which management data is changed for forming the image into two-page spread.

When the result of determination in steps S703, S704 and S712 is no, 1 is added to the variable a in step S717, and the flow proceeds to step S718.

In the example shown in FIGS. 26A, 26B, 27A and 27B, division information flag of pages 1 and 2 are not set, while division information flags of pages 3 and 4 are set. Therefore, the flow proceeds to step S705 when the variable a is 3.

In step S705, whether it is the page exchanging mode or not is determined. If it is, the flow proceeds to step S706, and if not, the flow proceeds to step S712.

In step S706, 1 is set in variable b. Thereafter, in step S707, whether or not the next image is divided data or not is determined. More specifically, whether or not the division information flag of the page a+2b in the management table is set or not is determined. If it is determined that the division information flag is set, then in step S708, 1 is added to the variable b, and determination of step S707 is repeated. When it is determined in step S707 that the division information flag is not set, the flow proceeds to step S709.

In the example of FIGS. 26A and 26B, when the variable a is 3 and variable b is 1, the division information flag of page 5 is not set, and hence addition to the variable b is not performed, and the flow proceeds to step S709.

In step S709, 1 is added to each of the pages a to a+2b−1 of the management table, so that image is formed on the page succeeding by one. Thereafter, in step S710, the page a+2b of the management table is changed to page a, so that the image which should be a two-page spread, is formed prior to the divided image. In step S711, the variable a is set to a+2b+1, and the variable b is set to 0, then the flow proceeds to step S718.

In the example of FIGS. 26A and 26B, as shown on the right side of the table, which show the page number after the change, pages 3 and 4 are changed to pages 4 and 5, and the page 5 is changed to page 3. Therefore, the images are output in such an order as shown in FIG. 10(a), and a spread image is provided on pages 3 and 4.

By the above described processing, pages of the management table are exchanged and the images can be formed as shown in FIGS. 26A and 26B.

When it is determined in step S705 that it is not the page exchanging mode, then the flow proceeds to step S712 in which whether it is a blank sheet inserting mode or not is determined. If it is determined in step S712 that it is the blank sheet inserting mode, the flow proceeds to step S713. If not, 1 is added to variable a in step S717, and the flow proceeds to step S718.

In step S713, 1 is added to every page following page a of the management table, so that the divided image appear on the two-page spread. Thereafter, in step S714, 1 is added to the total number of pages N. In steps S715, data of page a is formed in an empty area of the management table, so that a blank sheet is inserted prior to the divided image. Thereafter, in step S716, 2 is added to variable a.

In the example shown in FIGS. 27A and 27B, page 3 and 4 are changed to pages 4 and 5, respectively, and newly added blank page is inserted as page 3, as shown in the page numbers after change on the right side of the table.

Figure 10:
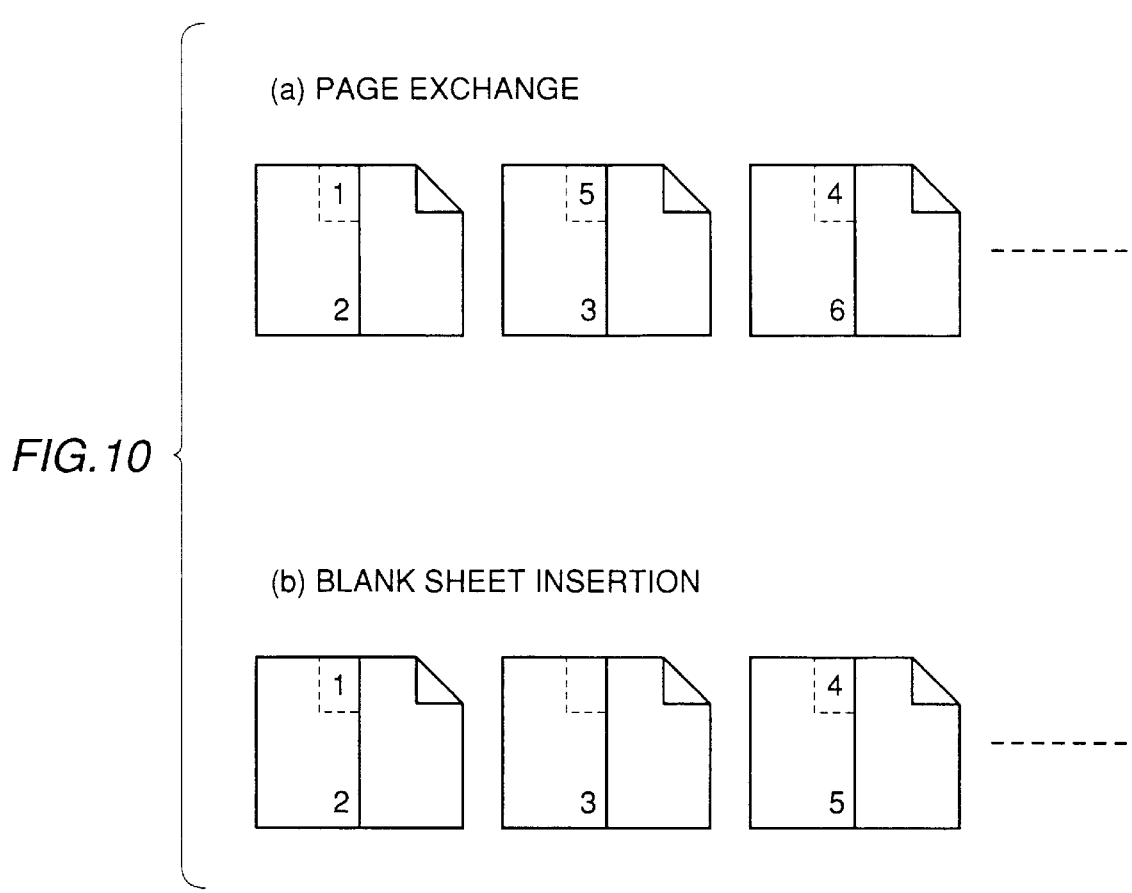
FIG. 10 is an illustration for providing a divided image of a longitudinally fed document on a two-page spread in the bookbinding mode.

Therefore, the images are output in the order as shown in (b) of FIG. 10, and a two-page spread image appears on pages 3 and 4.

Figure 28:
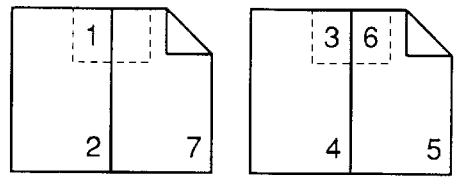
FIG. 28 shows an example in which position of a blank sheet to be inserted is designated in advance.
Figure 28:
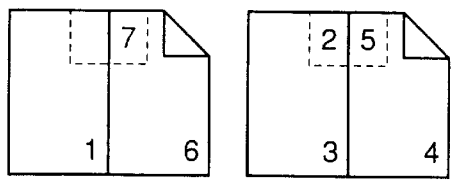
Figure 28:
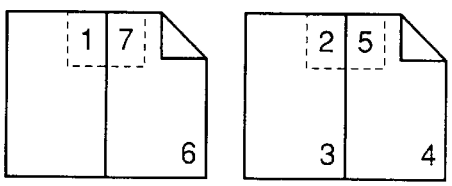
Figure 29:
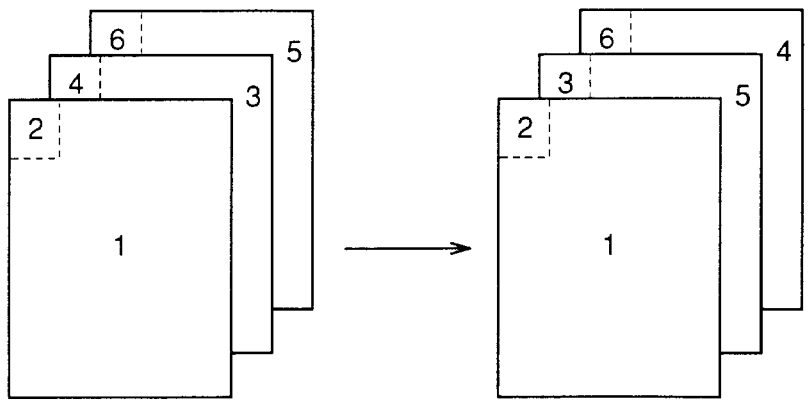
FIG. 29 shows an example of the present invention applied to a common double sided copying.
Figure 29:
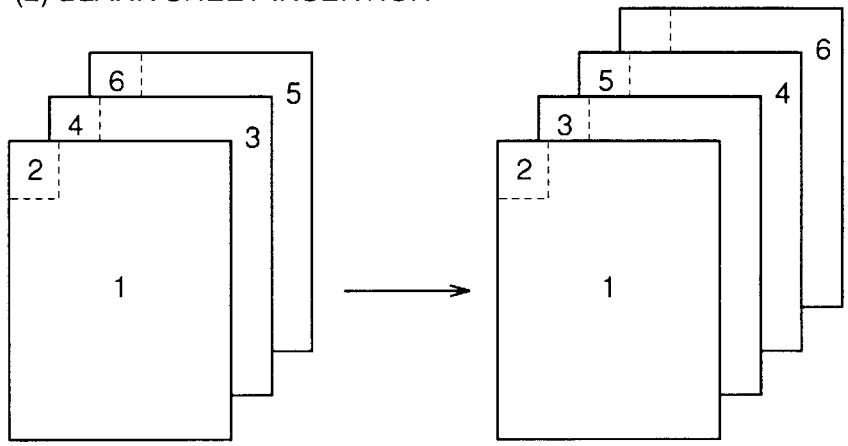

By the above described process, pages of the management table can be exchanged and images can be formed. Though the position of insertion of the blank sheet in the blank sheet inserting mode is before the divided image in the present embodiment, position of the blank sheets to be inserted may be designated in advance, the blank sheet may be formed at the designated position and pages to the divided image may be shifted successively. FIG. 28 shows examples in which the position of the blank sheet to be inserted is designated as the first page, and an example in which the position is designated to be the second page. The position to be designated may be any position provided that it precedes the image which is designated as the divided image.

Finally, whether or not processing of data of the number of pages is completed or not is determined. More specifically, in step S718, whether the variable a is the total number of pages N or not is determined. If the processing is not yet completed for the desired number of pages, the process of step S703 is repeated. If the processing is completed, the process is terminated and the flow returns to the main routine.

By the above described processing, it becomes possible to arrange the divided image on a two-page spread. Further, it is possible to exchange pages in normal double sided copying operation, regardless of the bookbinding mode.

FIG. 28 shows an example in which the present invention is applied to normal double sided copying operation. In the double sided copy mode, the page preceding the divided image is formed on an even-numbered page, under similar control as that shown in FIG. 25. By such control, the page preceding the divided image is formed on the second surface of the double sided copy both in the page exchanging mode and the blank sheet inserting mode, the page succeeding the divided image is formed on the next page, and therefore the divided image can be arranged on two-page spread after stapling.

The method of operating the position of image formation on the sheets of recording paper by storing document images described with reference to the present embodiment enables free operation of the positions of image formation on the sheets of recording paper, an image formation is possible to a number of times by only one reading. Therefore, bookbinding can be done in a simple manner at high speed. By using a circular type document feeding apparatus and feeding necessary documents as needed, forming images thereof and forming on the sheets of recording paper, it is possible to attain the present invention without storing the document images.

By the image forming apparatus of the present invention, images can be formed such that the images can be seen as continuous information in one direction, even when there are documents fed in the longitudinal direction and transverse direction mixed, without reducing the size of the images or changing the directions of the images, when images are formed for bookbinding such as saddle wiring and double-leaved side wiring.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising:
   image forming means for forming a plurality of images on a sheet of paper;
   image forming position setting means for setting position of the images to be formed on the sheet of paper;
   designating means for designating a prescribed image out of the plurality of images to be formed; and
   image forming position changing means for changing the page position of image formation such that page position of image formation of the designated image is set to a prescribed page position.

2. The image forming apparatus according to claim 1, wherein
   said image forming means has image storing means for storing a plurality of images to be formed.

3. The image forming apparatus according to claim 1, wherein
   the position of image formation set by said image forming position setting means is a position of image formation for saddle wiring.

4. The image forming apparatus according to claim 1, wherein
   the position of image formation set by said image forming position setting means is a position of image formation for double-leaved side wiring.

5. The image forming apparatus according to claim 1, wherein
   said image forming position changing means inserts a blank image when changing the position of image formation.

6. A method of image formation, comprising the steps of:
   setting page positions of images on a sheet of paper;
   designating a prescribed image out of a plurality of images; and
   changing page position of image formation so that the page position of image formation of said designated image is set to a prescribed page and forming the plurality of images on the sheet of paper.

7. The method of image formation according to claim 6, wherein
   the position of image formation set in the step of setting the position of image formation is the position of image formation for saddle wiring.

8. The method of image formation according to claim 6, wherein
   the position of image formation set in the step of setting the position of image formation is the position of image formation for double-leaved side wiring.

9. The method of image formation according to claim 6, wherein
   a blank image is inserted when the position of image formation is changed.

10. An image forming apparatus, comprising:
    taking means for taking image data including a plurality of pages;
    setting means for setting page position of the plurality of pages on a sheet;
    determining means for determining a page corresponding to a two-page spread, of said taken image data;
    changing means for changing the position of the page determined by said determining means for a prescribed page position on the sheet; and
    output means for outputting the image data of said page determined to be corresponding to a two-page spread such that the image is printed on a two-page spread image on sheets of paper.

11. The image forming apparatus according to claim 10, wherein
said output means includes exchanging means for exchanging at least some of said plurality of pages.

12. The image forming apparatus according to claim 10, wherein
said output means includes inserting means for inserting a blank page to said plurality of pages.

13. The image forming apparatus according to claim 10, wherein
said taking means includes means for reading a document; and
said determining means determines the page corresponding to a two-page spread, based on direction of said read document.

14. The image forming apparatus according to claim 13, wherein
said taking means takes image data of said read document divided into a plurality of pages, based on the direction of said read document.

15. The image forming apparatus according to claim 10, wherein
said output means outputs image data for double-leaved side wiring.

16. The image forming apparatus according to claim 10, wherein
said output means outputs image data for saddle wiring.

17. The image forming apparatus according to claim 10, further comprising
storing means for storing image data taken by said taking means, wherein
said output means includes means for exchanging at least a part of content of said stored image data.

18. The image forming apparatus according to claim 10, further comprising
storing means for storing image data taken by said taking means, wherein
said output means includes means for inserting other data to contents of said stored image data.

19. The image forming apparatus according to claim 10, wherein
said taking means takes image data in which a page corresponding to a two-page spread and other page are mixed.

20. The image forming apparatus according to claim 10, further comprising
generating means for generating sheets of paper including a two-page spread, by printing said output image data on a plurality of sheets of paper.

21. An image forming apparatus, comprising:
image forming means for forming a plurality of images on a sheet of paper;
image forming position setting means for setting position of the images to be formed on the sheet of paper;
designating means for designating a prescribed image out of the plurality of images to be formed; and
image forming position changing means for changing the position of image formation such that position of image formation of the designated image is set to a prescribed position;
wherein the position of image formation set by said image forming position setting means is a position of image formation for saddle wiring.

22. An image forming apparatus, comprising:
image forming means for forming a plurality of images on a sheet of paper;
image forming position setting means for setting position of the images to be formed on the sheet of paper;
designating means for designating a prescribed image out of the plurality of images to be formed; and
images forming position changing means for changing the position of image formation such that position of image formation of the designated image is set to a prescribed position;
wherein the position of image formation set by said image forming position setting means is a position of image formation for double-leaved side wiring.

23. A method of image formation, comprising the steps of:
setting positions of images on sheets of paper;
designating a prescribed image out of a plurality of images; and
changing position of image formation so that the position of image formation of said designated image is set to the position set in said step of setting the image formation position and forming the plurality of images on the sheets of paper;
wherein the position of image formation set in the step of setting the position of image formation is the position of image formation for saddle wiring.

24. A method of image formation, comprising the steps of:
setting positions of images on sheets of paper;
designating a prescribed image out of a plurality of images; and
changing position of image formation so that the position of image formation of said designated image is set to the position set in said step of setting the image formation position and forming the plurality of images on the sheets of paper;
wherein the position of image formation set in the step of setting the position of image formation is the position of image formation for double-leaved side wiring.

25. An image forming apparatus, comprising:
taking means for taking image data including a plurality of pages;
determining means for determining a page corresponding to a two-page spread, of said taken image data; and
output means for outputting the image data of said page determined to be corresponding to a two-page spread such that the image is printed as a two-page spread image on sheets of paper;
wherein said output means includes exchanging means for exchanging at least some of said plurality of pages.

26. An image forming apparatus, comprising:
taking means for taking image data including a plurality of pages;
determining means for determining a page corresponding to a two-page spread, of said taken image data; and
output means for outputting the image data of said page determined to be corresponding to a two-page spread such that the image is printed as a two-page spread image on sheets of paper;
wherein said output means includes inserting means for inserting a blank page to said plurality of pages.

27. An image forming apparatus, comprising:
taking means for taking image data including a plurality of pages;

determining means for determining a page corresponding to a two-page spread, of said taken image data; and output means for outputting the image data of said page determined to be corresponding to a two-page spread such that the image is printed as two-page spread image on sheets of paper;

wherein said output means outputs image data for double-leaved side wiring.

28. An image forming apparatus, comprising:

taking means for taking image data including a plurality of pages;

determining means for determining a page corresponding to a two-page spread, of said taken image data; and output means for outputting the image data of said page determined to be corresponding to a two-page spread such that the image is printed as a two-page spread image on sheets of paper;

wherein said output means outputs image data for saddle wiring.

29. An image forming apparatus, comprising:

taking means for taking image data including a plurality of a pages;

determining means for determining a page corresponding to a two-page spread, of said taken image data; and output means for outputting the image data of said page determined to be corresponding to a two-page spread such that the image is printed as a two-page spread image on sheets of paper;

further comprising storing means for storing image data taken by said taking means, wherein said output means includes means for exchanging at least a part of content of said stored image data.

* * * * *